United States Patent
Liu et al.

(10) Patent No.: US 10,140,616 B2
(45) Date of Patent: *Nov. 27, 2018

(54) RISK ASSESSMENT RULE SET APPLICATION FOR FRAUD PREVENTION

(71) Applicant: VISA International Service Association, San Francisco, CA (US)

(72) Inventors: Frederick Liu, Oakland, CA (US); Nancy Hilgers, Danville, CA (US); Mark Nelsen, Oakland, CA (US); Kevin Siegel, Milpitas, CA (US); Christopher Brown, Oakland, CA (US); Thomas Dwyer, San Mateo, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/838,345

(22) Filed: Dec. 11, 2017

(65) Prior Publication Data

US 2018/0101852 A1      Apr. 12, 2018

Related U.S. Application Data

(63) Continuation of application No. 14/585,067, filed on Dec. 29, 2014, now Pat. No. 9,842,336, which is a
(Continued)

(51) Int. Cl.
*G06Q 20/40* (2012.01)

(52) U.S. Cl.
CPC ......... *G06Q 20/4016* (2013.01); *G06Q 20/40* (2013.01); *G06Q 20/405* (2013.01)

(58) Field of Classification Search
USPC ........................................... 705/44
See application file for complete search history.

(56) References Cited

U.S. PATENT DOCUMENTS

| 5,819,226 A | 10/1998 | Gopinathan et al. |
| 6,016,963 A | 1/2000 | Ezawa et al. |

(Continued)

OTHER PUBLICATIONS

International Preliminary Report on Patentability dated Nov. 9, 2011, 5 pages.

(Continued)

*Primary Examiner* — Lindsay M Maguire
(74) *Attorney, Agent, or Firm* — Loeb & Loeb LLP

(57) ABSTRACT

Rules, applied to deny authorization of likely fraudulent transactions, are derived from a modified Patient Rule Induction Method algorithm that uses a target variable and a data set of past transactions each associated with a plurality of input variables and a hyper-rectangle enclosing a multi-dimensional space defined by a representation of the input variable values as points within the multi-dimensional space. While a count of the points within the hyper-rectangle is greater than a minimum support parameter, a first plurality of points proximal to edges of the hyper-rectangle are removed, where each such removing maximizes a mean value of the target variable, and then, while the mean value remains maximized, a second plurality of points proximal to the edges is added, where each adding maximizes or maintains the mean value. The hyper-rectangle is bounded within a minimum bounding box that defines the rules.

19 Claims, 21 Drawing Sheets

Related U.S. Application Data continuation of application No. 12/774,521, filed on May 5, 2010, now Pat. No. 8,924,279.

(60) Provisional application No. 61/176,214, filed on May 7, 2009.

(56) References Cited

U.S. PATENT DOCUMENTS

| | | |
|---|---|---|
| 6,098,879 A | 8/2000 | Terranova |
| 6,154,746 A | 11/2000 | Berchtold et al. |
| 6,330,546 B1 | 12/2001 | Gopinathan et al. |
| 6,601,048 B1 | 7/2003 | Gavan et al. |
| 6,650,779 B2 | 11/2003 | Vachtesvanos et al. |
| 7,158,947 B1 | 1/2007 | Findley |
| 7,231,657 B2 | 6/2007 | Honarvar et al. |
| 7,251,624 B1 | 7/2007 | Lee et al. |
| 7,263,506 B2 | 8/2007 | Lee et al. |
| 7,433,855 B2 | 10/2008 | Gavan et al. |
| 7,527,195 B2 | 5/2009 | Keithley et al. |
| 7,657,460 B2 | 2/2010 | Findley |
| 7,657,497 B2 | 2/2010 | Nandy |
| 7,668,769 B2 | 2/2010 | Baker et al. |
| 2002/0054694 A1 | 5/2002 | Vachtsevanos et al. |
| 2002/0054964 A1 | 5/2002 | Hartmann |
| 2003/0004938 A1 | 1/2003 | Lawder |
| 2003/0097330 A1 | 5/2003 | Hillmer et al. |
| 2003/0204499 A1 | 10/2003 | Shahabi et al. |
| 2004/0162834 A1 | 8/2004 | Aono et al. |
| 2006/0226216 A1 | 10/2006 | Keithley et al. |
| 2007/0061259 A1 | 3/2007 | Zoldi et al. |
| 2007/0136199 A1 | 6/2007 | Findley |
| 2007/0192249 A1 | 8/2007 | Biffle et al. |
| 2007/0282674 A1 | 12/2007 | Gomes et al. |
| 2007/0288641 A1 | 12/2007 | Lee et al. |
| 2008/0021829 A1 | 1/2008 | Kranzley |
| 2008/0046334 A1 | 2/2008 | Lee et al. |
| 2009/0106151 A1 | 4/2009 | Nelsen et al. |
| 2010/0287099 A1 | 11/2010 | Liu |

OTHER PUBLICATIONS

International Search Report dated Dec. 9, 2010, 3 pages.
International Preliminary Report on Patentability dated Nov. 11, 2011 corresponding to PCT/US2010/033861.
International Search Report and Written Opinion for PCT/US2010/033861 dated Dec. 9, 2010 (7 pages).

1200a

Real Time Decline Rule Set

Rule #1: Card Present Foreign

Criteria
|  | POS Entry Mode | IN | (90) |
|---|---|---|---|
| AND | Advanced Authorization Risk Score | >= | 75 |
| AND | Merchant Country Code | NOT IN | (US) |

Rule #2: ATM Tran Amount

Criteria
|  | Merchant Category Code (MCC) | = | 6011 |
|---|---|---|---|
| AND | Advanced Authorization Risk Score | >= | 90 |
| AND | Transaction Amount (U.S. $) | >= | 501.00 |

1200b

SUMMARY REPORT
Dates: 2008 October 12 - 2008 April 12
Criteria: BID - 10000032

Total Transactions Analyzed          2,500,000

| Rule Set | FPR | Triggered s Trans | % | Fraud Trans | % | Fraud Amt |
|---|---|---|---|---|---|---|
| Real Time Decline | 5:1 | 600 | 4% | 100 | 10% | $950,000 |
| Case Creation | 15:1 | 14,400 | 96 | 900 | 90% | $1,425,000 |

| Rule Set | Approved Trans | Fraud Trans | Fraud Amt |
|---|---|---|---|
| Authorization Approval | 250,000 | 50 | $150,000 |

1200c

Rule Set Details

Rule Set: Real Time Decline

| Priority | Rule Name | Triggered Trans | Fraud % | Fraud Trans | Amt | % | FPR |
|---|---|---|---|---|---|---|---|
| 1 | Card Present Foreign | 450 | 75% | 85 | $900,000 | 95% | 4.2:1 |
| 2 | AMT AA Score | 150 | 25% | 15 | $50,000 | 5% | 9:1 |

Figure 12

AA Opportunity:

Tran Aggregate for RTD  1300a

| VIP Risk Score | Cum Good Trxs | Cum Fraud Trxs | Cum Good Amt | Cum Fraud Amt | FPR trxs | FPR Amt | FPR trxs | FPR Amt |
|---|---|---|---|---|---|---|---|---|
| 95 | 406,911 | 101,466 | $ 52,016,230 | $ 14,308,989 | 4.0 : 1 | 3.6 : 1 | 4.0 : 1 | 3.6 : 1 |
| 94 | 533,949 | 121,789 | $ 69,122,160 | $ 16,990,787 | 4.4 : 1 | 4.1 : 1 | 4.4 : 1 | 4.1 : 1 |
| 93 | 679,769 | 142,635 | $ 87,883,745 | $ 19,552,631 | 4.8 : 1 | 4.5 : 1 | 4.8 : 1 | 4.5 : 1 |
| 92 | 835,143 | 162,548 | $ 108,867,037 | $ 22,099,787 | 5.1 : 1 | 4.9 : 1 | 5.1 : 1 | 4.9 : 1 |
| 91 | 1,000,449 | 182,929 | $ 130,738,979 | $ 24,620,839 | 5.5 : 1 | 5.3 : 1 | 5.5 : 1 | 5.3 : 1 |
| 90 | 1,194,306 | 205,721 | $ 156,607,172 | $ 27,286,053 | 5.8 : 1 | 5.7 : 1 | 5.8 : 1 | 5.7 : 1 |

Acct Aggregate for Case Creation  1300b

| Risk Score | Cum Good Accts | Cum Fraud Accts | Cum Good Amt | Cum Fraud Amt | FPR (Acct) |
|---|---|---|---|---|---|
| 79 | 4,228,121 | 304,206 | $ 7,225,587,394 | $ 177,751,303 | 13.9 : 1 |
| 78 | 4,644,711 | 323,564 | $ 7,855,468,411 | $ 185,736,006 | 14.4 : 1 |
| 77 | 5,083,970 | 343,773 | $ 8,539,807,819 | $ 193,965,501 | 14.8 : 1 |
| 76 | 5,555,300 | 363,628 | $ 9,220,712,294 | $ 201,860,074 | 15.3 : 1 |
| 75 | 6,051,591 | 383,987 | $ 9,941,974,806 | $ 209,595,513 | 15.8 : 1 |
| 74 | 6,572,177 | 403,242 | $ 10,717,502,780 | $ 217,432,090 | 16.3 : 1 |
| 73 | 7,113,131 | 422,302 | $ 11,497,549,490 | $ 225,158,165 | 16.8 : 1 |

| Real Time Declines | Account Queuing |
|---|---|
| Program specific interchange rates<br>    Credit Debit      Bus. Debit<br>    * 1.82%         1.38%    2.28% | No lost Interchange from false positives; accounts are queued. |
| Benefit does not include subsequent fraud on alerted account. Each transaction is considered independently. | Cost per false positive: $5 (operational costs, etc.) |
| Capture Efficiency: 100%<br>    Each alert results in all fraud saved for that transaction. | Capture Efficiency: 50%<br>    50% of alerted fraud can be saved.<br>    Accounts for operational (in)efficiencies |
| We expect that Rule sets will perform no worse than 5:1 FPR. | We expect that Rule sets perform no worse than 15:1 FPR. |

1400b

| False Decline Reduction | Model Assumptions |
|---|---|
| AA risk indicators can be used to reduce false declines | Except for real-time declines, Analysis does not use hard FPR limits. |
| False declines<br>    Transactions from good accounts ( i.e. no reported fraudulent activity) having ISO_RESP_CD = 59<br>    • Additional benefit could result from additional analysis of '05' declines.<br>    • Only AA RISK SCORE < 20 considered | Fraud mitigation strategy considers benefits from over CP transactions only. |
| Benefit := 100% of interchange from declined transaction + recouped operational expense<br>Cost := Fraud from false negatives | Conservative estimates are used whenever possible. |

```
Rules Optimizer Full Analysis

1.    Select rule type(s) to generate

___ Real Time Decline

___ Case Creation

___ Authorization Approval

2.    Select existing rule(s) to optimize

ALL

Rule Name                    Version      Rule Time                    Status
 __   Advanced Auth Domestic       003          Real Time Decisioning        Active
 __   Advanced Auth Foreign        001          Real Time Decisioning        Active
 __   Brazil Signature Strategy    001          Case Creation                Active __

Display Inactive

Generate Rule                          Cancel
```

Rules Optimizer Results

Previous Results

| | Date | Name | Status | User Name | Organization |
|---|---|---|---|---|---|
| ☐ | March 16, 2009 09:30 | Full Analysis | Processing | Tom Smith | Regional Bank ABC |
| ☐ | March 10, 2009 11:25 | Signature Cards | Available | Dave Johns | Regional Bank ABC |
| ☐ | March 10, 2009 10:30 | Compromise ABC | Available | Dave Johns | Regional Bank ABC |

| Start New Analysis | Performance Summary | View Rules | Delete | Print |

─1700b

Rules Optimizer – Performance Summary

Name: Monthly Update
Generated : March 15, 2009 10:15
View Parameters

Total Transactions Analyzed: 2,500,000

| Rule Type | FPR | Triggered Trans | % | Fraud Trans | % | Fraud Amt |
|---|---|---|---|---|---|---|
| Real Time Decline | 5:1 | 600 | 4% | 100 | 10% | $950,000 |
| Case Creation | 15:1 | 14,400 | 96% | 900 | 90% | $1,425,000 |
| | | 15,000 | 100% | 1,000 | 100% | $2,375,000 |

| Rule Type | Approved Trans | Fraud Trans | Fraud Amt |
|---|---|---|---|
| Authorization Approval | 250,000 | 100 | $150,000 |

Select All

| View Rules | Performance Details | Test | Publish | Cancel |

Rules Optimizer – Performance Details

Name: Monthly Update
Generated: March 15, 2009 10:15
View Parameters

Detailed Results

| Priority | Rule Name | FPR | Triggered Trans | % | Fraud Trans | % | Fraud Amt |
|---|---|---|---|---|---|---|---|
| ☐ 1 | Card Present Foreign | 4.2:1 | 450 | 75% | 85 | 95% | $900,000 |
| ☐ 2 | AA Score, ATM | 9:1 | 150 | 25% | 15 | 5% | $50,000 |
| | | | 600 | 100% | 100 | 100% | $950,000 |

Select All

[ Test ]  [ Publish ]  [ Cancel ]

Figure 18

RISK ASSESSMENT RULE SET APPLICATION FOR FRAUD PREVENTION

CROSS-REFERENCE TO RELATED APPLICATIONS

This application claims priority to U.S. application Ser. No. 14/585,067, filed on Dec. 29, 2014, which claims priority to U.S. application Ser. No. 12/774,521, filed May 5, 2010, both titled "Risk Assessment Rule Set Application For Fraud Prevention," which claims the benefit of U.S. Application Ser. No. 61/176,214, filed May 7, 2009, titled "Fraud Prevention Based On Optimized Risk Assessment Rule Set," all of which are incorporated herein by reference.

FIELD

Aspects of the present invention relate in general to financial services. Aspects include a financial fraud prevention apparatus, system, method and computer-readable storage medium configured to optimize fraud prevention rules using historical transaction data in a payment processing system and to implement the optimized fraud prevention rules.

BACKGROUND

When an account holder makes a purchase from a merchant, a payment card corresponding to the account can be used to pay for the transaction. The merchant forwards the financial transaction information to an acquiring bank (herein referred to as the "acquirer"). A payment processor (such as Visa®, MasterCard®, American Express®, etc.) receives the transaction information and then forwards it to the payment card issuing bank (the "issuer") for approval. The issuer decides on whether or not to approve the cardholder's purchase. The existing model requires that issuers have a great deal of technical infrastructure in order to support payment cards. Additionally, maintaining the technical infrastructure is both expensive and difficult, as issuers must monitor and react to various types of payment card fraud. Issuers suffer a great deal of losses due to fraud schemes.

Various business rules are used to manage the risk of authorizing a fraudulent transaction. An example of a business rule would be to decline any attempt to withdrawal currency from an Automatic Teller Machine (ATM) if: (i) a risk score, calculated according to a predetermined algorithm using one or more predetermined parameters, exceeds a predetermined threshold, and (ii) the currency to be withdrawn from the ATM exceeds a predetermined threshold.

Financial institutions, however, often lack the expertise to effectively write fraud strategies in terms of business rules. Moreover, developing fraud reduction strategies are often manual and rely heavily on human intuition. Accordingly, it would be an advance in the relevant art to allow a user to input desired optimization parameters for business rules for a fraud reduction strategy, and to use the user's input to produce a recommended set of business rules that are based upon predetermined fraud and authorization strategies using data driven models. Thereafter, it would further be an advance in the relevant art to provide the user with tools to intelligently monitor and update fraud reduction strategies through modification to existing business rules. Moreover, it would be an advance in the art to use these authorization optimization strategy tools to implement more targeted strategies for declining requests to authorize transactions, and to identify strategies to approve more low risk transactions.

SUMMARY

In one implementation, a method prevents fraud by denying authorization, using authorization business rules, of a transaction with a merchant that is conducted on an account issued by an issuer to an account holder. The method includes obtaining a data set of past transactions and a target variable, each associated with a plurality of input variables, and defining a hyper-rectangle enclosing a multi-dimensional space defined by a representation of the input variable values as points within the multi-dimensional space.

The method includes removing (or 'peeling'), while a count of the points within the hyper-rectangle is greater than a minimum support parameter, a first plurality of points close to the hyper-rectangle's edge, where each removing (or 'peeling') maximizes a mean value of the target variable, and then, while the mean value remains maximized, adding (or 'covering' or 'pasting') a second plurality of points close to the hyper-rectangle's edge, where each adding maximizes or maintains the mean value. The method further includes bounding the hyper-rectangle within a minimum bounding box and identifying the authorization business rules defining the minimum bounding box. Essentially, the method examines the values in the minimum bounding box and includes only those values with variables associated with the removing (or 'peeling') or adding (or 'covering' or 'pasting') steps.

Alternatively, the removal ('or peeling') and addition (or 'covering' or 'pasting') of the points does not have to be based on the maximizing the mean value. Although points can be added, points are not required to be added so as to maximize or maintain the mean value. Rather, the mean value can actually decline so long as it the mean value does not fall below a predetermined threshold. The authorization business rules that are identified as defining the minimum bounding box. The minimum bounding box can be thought of as containing point. The points that are within the final box define a subspace defined by only those dimensions involved in the removal ('or peeling') and the addition (or 'covering' or 'pasting') of the points. Those values not involved in peeling or covering are omitted from the authorization business rules that are identified as defining the minimum bounding box.

In another implementation, a method prevents fraud in a transaction by denying authorization, using a plurality of authorization business rules, of the transaction with a merchant that is conducted on an account issued by an issuer to an account holder. The method is presented for a payment processing system in which a transaction handler processes a plurality of transactions each characterized by a consumer and a merchant engaging in one transaction upon an account within the payment processing system, where an issuer has issued the account to the consumer, and wherein the merchant submits the transaction to an acquirer for processing by the transaction handler who requests the issuer to disburse funds from the consumer for the one said transaction, and where the issuer forwards the funds to the transaction handler who forwards the funds to the acquirer to disburse the funds to the merchant for the transaction. The method comprises defining a target variable associated with a data set, where the data set is associated with a plurality of input variables each having input variable values, and where the target variable represents an output value based on at least one input variable value. The target variable is then provided to a business rules optimizer service for optimization, where the optimization include: defining a hyper-rectangle enclosing a multi-dimensional space defined by the representation of the input variable values as points within the multi-dimensional space, where each edge of the hyper-rectangle is associated with one of the plurality of input variables, removing, while a count of the points within the hyper-rectangle is greater than a minimum support parameter, points along at least two of the edges, where each removing maximizes a mean value of the target variable for the hyper-rectangle, and then adding, while the mean value remains maximized, points along at least two of the edges, where each adding maximizes or maintains the mean value, bounding the hyper-rectangle within a minimum bounding box, and identifying the plurality of authorization business rules that define the minimum bounding box. The method further comprises receiving the plurality of optimized business rules from the optimizer service and providing the plurality of optimized business rules to a transaction handler, or other party, to the apply the same in deciding whether to authorize a transaction between a merchant and an account holder that is conducted on an account issued to the account holder.

BRIEF DESCRIPTION OF THE DRAWINGS

Implementations will become more apparent from the detailed description set forth below when taken in conjunction with the drawings, in which like elements bear like reference numerals.

FIG. 12 shows reports, including an example of a set of rules, a summary report of a modeling of a set of business rules, and a detailed report for a particular rule to reduce fraud in transactions in a payment processing system;

FIG. 13 shows reports of opportunities, using optimized business rules, for an issuer to reduce fraud while increasing authorizations of low risk transactions in a payment processing system;

FIG. 14 shows exemplary business assumptions and constrains used in optimizing rules for reducing fraud in a payment processing system;

FIGS. 15-18 show screen shots of an exemplary user interface that can be used in an interactive application to optimize rules for reducing fraud in a payment processing system;

DESCRIPTION

Implementations provide a strategy and business rule optimizer that will analyze historical fraud and authorization decline data from transactions in a payment processing system. This analysis will identify an optimal set of: (i) strategies as to when to decline to authorize a transaction in real time; (ii) strategies as to when to initiate an investigation of a transaction that has occurred as to whether the transaction was fraudulent (hereinafter, "case creation"); and (iii) strategies to increase, where appropriate, the number of transaction that are authorized which, according to optimized business rules, are deemed to have a low risk of being fraudulent. Note, however, that (i) and (ii) can be generalized to other fraud mitigation measures such as sending a message to an account holder, etc.

The historical fraud and authorization decline data that is analyzed can include past transactions not only for one issuer, but also for similarly situated issuers (e.g., peers of the issuers). Moreover, this historical data can include past transactions not only for just one payment processor (such as Visa®, MasterCard®, American Express®, etc.), but also for the past transactions of multiple payment processors. As such, the identification of fraud patterns in a payment processing system can be better assessed and thereby result in greater reductions in fraud. Also, this use of more historical data can indicate those lower risk transactions that should be approved which would have otherwise been declined by non-optimized business rules. The number of case creations can be more properly reduced, or be properly increased, through better analysis of more historical transaction data in a payment processing system.

Figure 1A:
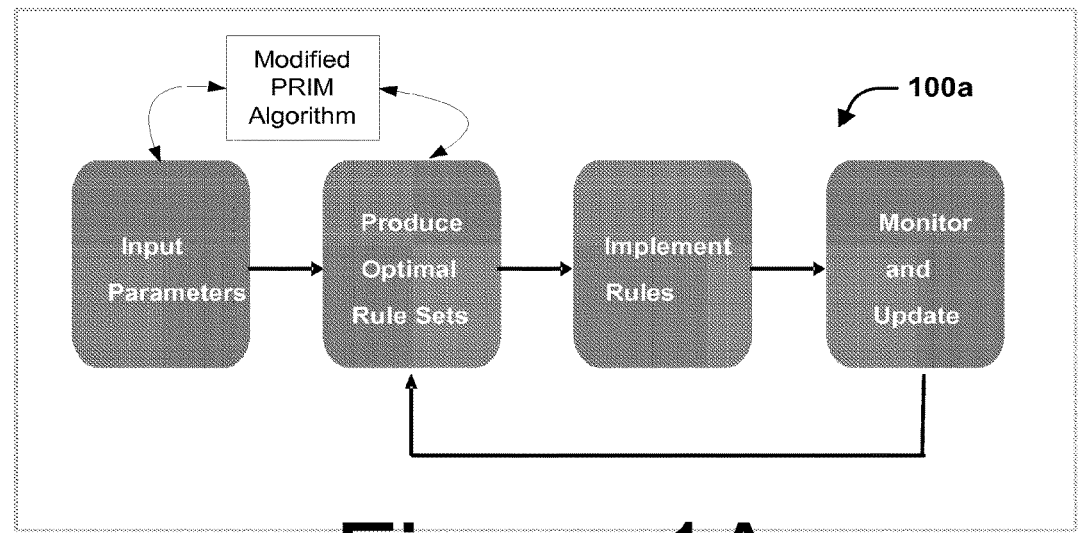
FIGS. 1A and 1B show two (2) flowcharts each depicting an exemplary method for implementing optimized fraud prevention rules to be used for transactions in a payment processing system.

FIG. 1A represents a method 100a in which sequential and looping steps permit a user to: (i) input desired optimization parameters; (ii) mandate the use of those parameters to produce a recommended set of fraud and authorization strategies using data driven models; (iii) initiate the implementation of the recommended set of fraud and authorization strategies as optimized business rules; and (iv) be provided with, and use, tools to intelligently monitor and update the implemented business rules, thereby optimizing still further the business rules going forward. Note that blocks (i)-(ii) can used a modified Patient Rule Induction Method (PRIM) as described with respect to FIG. 11, below.

Figure 1B:
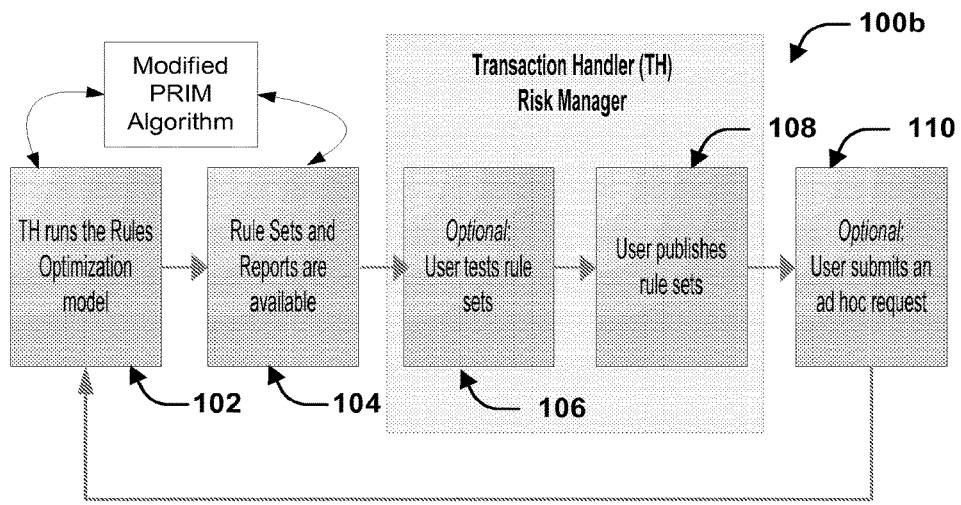

FIG. 1B represents a method 100b in which sequential and looping steps have a payment processor (also referred to herein as a Transaction Handler (TH)) perform an analysis upon historical transaction data in a payment processing system to optimize business rules, at step 102, to reduce fraud, where appropriate, in an issuer's transactions. The process of performing such an analysis is described below. These optimized business rules are given to the issuer, at step 104, as business rule sets, which can also be described in reports to the issuer that summarize how fraud is reduced by use of the optimized business rules. The issuer may also run tests, at step 106, on the business rules. In that the issuer's intuition' may play a role in the ultimate business rule sets, the testing by the issuer provides the issuer this opportunity to vet their intuition or other subjective criteria.

Upon the issuer's acceptance, at step 106, the issuer gives instructions to implement a final, optimized set of ultimate business rules. In various implementations, this implementation of the optimized business rules can be performed solely by the issuer, solely by the payment processor using business rules provided by the issuer, or by both issuer and payment processor with each performing varying portions of the implemented optimized business rules.

At step 110 of the illustrated method 100b of FIG. 1B, the issuer can input their own desired optimization parameters so that the issuer, in effect, submits an ad hoc request for a more targeted analysis. Should the targeted analysis suggest changes to the implemented business rules, those changes can then be implemented, at step 108, to still further optimize the implemented business rules. For example, the recommended set of fraud and authorization strategies would encompass the intelligence to recommend authorization strategies for low risk transactions, thereby allowing issuers to approve more low risk transaction of the mutual benefits realized by issuers, acquirers, merchants and account holders benefits. Note that blocks 102-104 can used a modified Patient Rule Induction Method (PRIM) as described with respect to FIG. 11, below.

Figure 19:
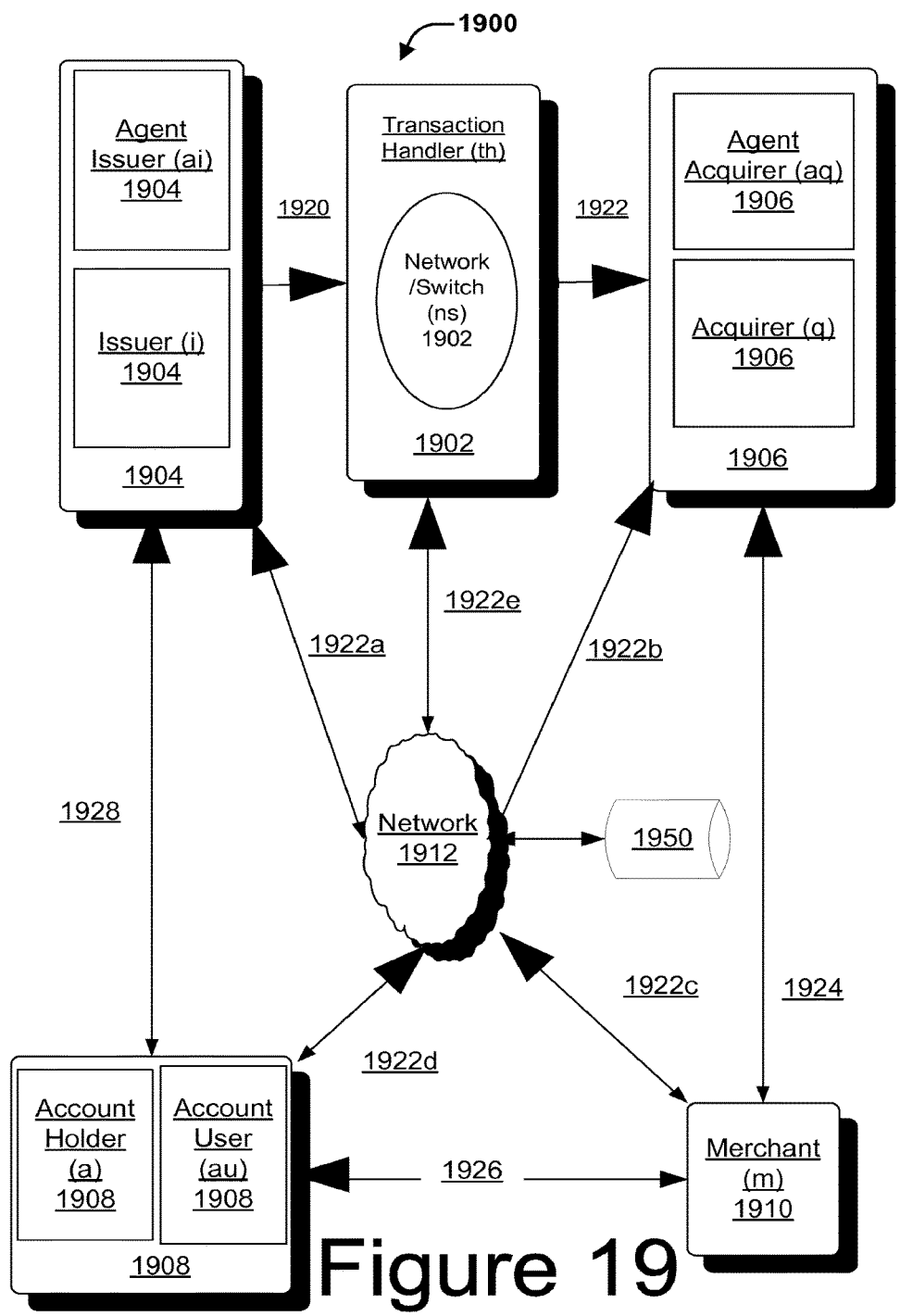
FIG. 19 depicts a block diagram of an exemplary payment processing system.

To give an appreciation of use of optimized business rules in a payment processing system, a discussion of each is now presented in reference to FIG. 19, which shows in an exemplary payment processing network 1900. In payment processing network 1900, a payment card is used by an account holder to conduct a transaction with a merchant on an account issued to the account holder by an issuer. The account holder uses a credit card or debit card, but it is understood that other payment card equivalents may be substituted. These equivalents may include, but are not limited to: a cellular telephone (e.g.; mobile phone), key tag, payment fob, or any other electronic payment device known in the art. As shown in FIG. 19, payment processing system 1900 supports importing fraud prevention rules from an issuer (i) 1904 and implementing them in real-time at a payment processor 200 (seen in FIG. 19 as transaction handler (th) 1902). When the consumer (seen in FIG. 19 as account user (au) 1908) uses a payment card of an account holder (a) 1908 at a merchant (m) 1910 to pay for a product or service, the merchant (m) 1910 contacts an acquirer (q) 1906 (for example, a commercial bank) to determine whether the consumer is credit worthy or the account has sufficient funds on the card to pay for the transaction. The acquirer (q) 1906 forwards the details of the payment transaction to a transaction handler (th) 1902 for processing. It is understood that, for backward compatibility, the payment card, merchant (m) 1910, and acquirer (q) 1906, may be any payment card, merchant, and acquirer known in the art.

In one implementation, the transaction handler (th) 1902 may be any payment network configured to import fraud prevention rules from an issuer (i) 1904, and implement the rules in real-time. Based on fraud prevention rules uploaded from issuer 300 (seen in FIG. 19 as issuer (i) 1904), the transaction handler (th) 1902 determines whether the transaction should be allowed; in other instances, the transaction handler (th) 1902 queries the issuer (i) 1904 to determine whether a debit payment card has enough funds to allow the transaction. Internal details of transaction handler (th) 1902 are discussed below. In this implementation, issuer (i) 1904 may be any payment card issuer configured to upload fraud prevention rules to a transaction handler (th) 1902 for implementation in real-time. In some instances, issuer (i) 1904 may include a workstation capable of creating, testing, and uploading fraud prevention rules to transaction handler (th) 1902. Further details of issuer (i) 1904 are also discussed below. In yet another implementation, the issuer implements the rules, and need not upload the rules to transaction handler (th) 1902.

Figure 2:
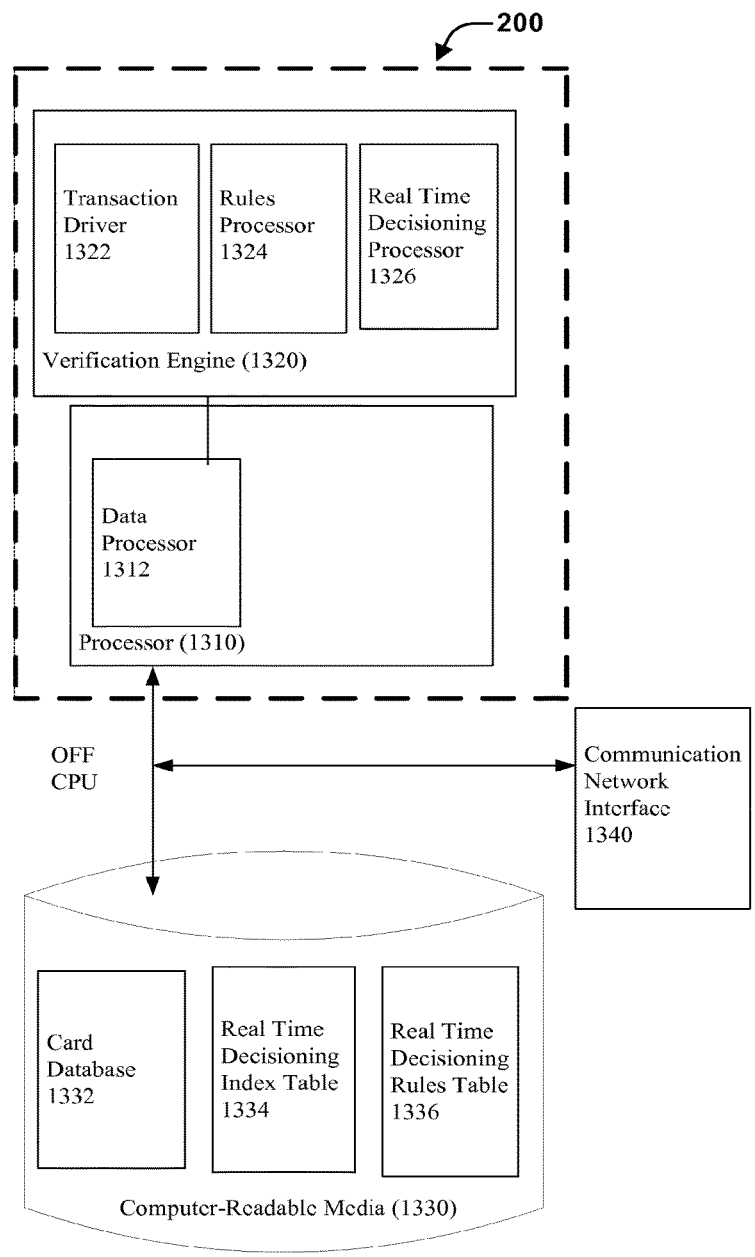
FIG. 2 depicts an implementation of a payment processor configured to import fraud prevention rules from an issuer and implement them in real-time.

Implementations of transaction handler (th) 1902 will now be disclosed with reference to a payment processor 200 of FIG. 2. Payment processor 200 may run a multi-tasking operating system (OS) and include at least one processor or central processing unit (CPU) 1310. Processor 1310 may be any central processing unit, microprocessor, micro-controller, computational device or circuit known in the art.

It is well understood by those in the art, that the functional elements of FIG. 2 may be implemented in hardware, firmware, or as software instructions and data encoded on a computer-readable storage medium 1330. As shown in FIG. 2, processor 1310 is functionally comprised of a verification engine 1320 and data processor 1312. Verification engine 1320 may further comprise: transaction driver 1322, rules processor 1324, and real time decisioning processor 1326. These structures may be implemented as hardware, firmware, or software encoded on a computer readable medium, such as storage media 1330.

Data processor 1312 interfaces with storage medium 1330 and network interface 1340. The data processor 1312 enables processor 1310 to locate data on, read data from, and writes data to, these components.

Network interface 1340 may be any data port as is known in the art for interfacing, communicating or transferring data across a computer network. Examples of such networks include Transmission Control Protocol/Internet Protocol (TCP/IP), Ethernet, Fiber Distributed Data Interface (FDDI), token bus, or token ring networks. Network interface 1340 allows payment processor 200 to communicate with issuer 300 (FIG. 3), and may allow communication with acquirer (q) 1906 (FIG. 19).

Computer-readable storage medium 1330 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, transistor-based memory or other computer-readable memory device as is known in the art for storing and retrieving data. Significantly, computer-readable storage medium 1330 may be remotely located from processor 1310, and be connected to processor 1310 via a network such as a local area network (LAN), a wide area network (WAN), or the Internet. In addition, as shown in FIG. 2, storage media 1330 may also contain a card database 1332, a real time decisioning index table 1334, and a master real time decisioning rules table 1336. The function of these structures may best be understood with respect to the flowcharts of FIGS. 4-6, as described below.

Figure 3:
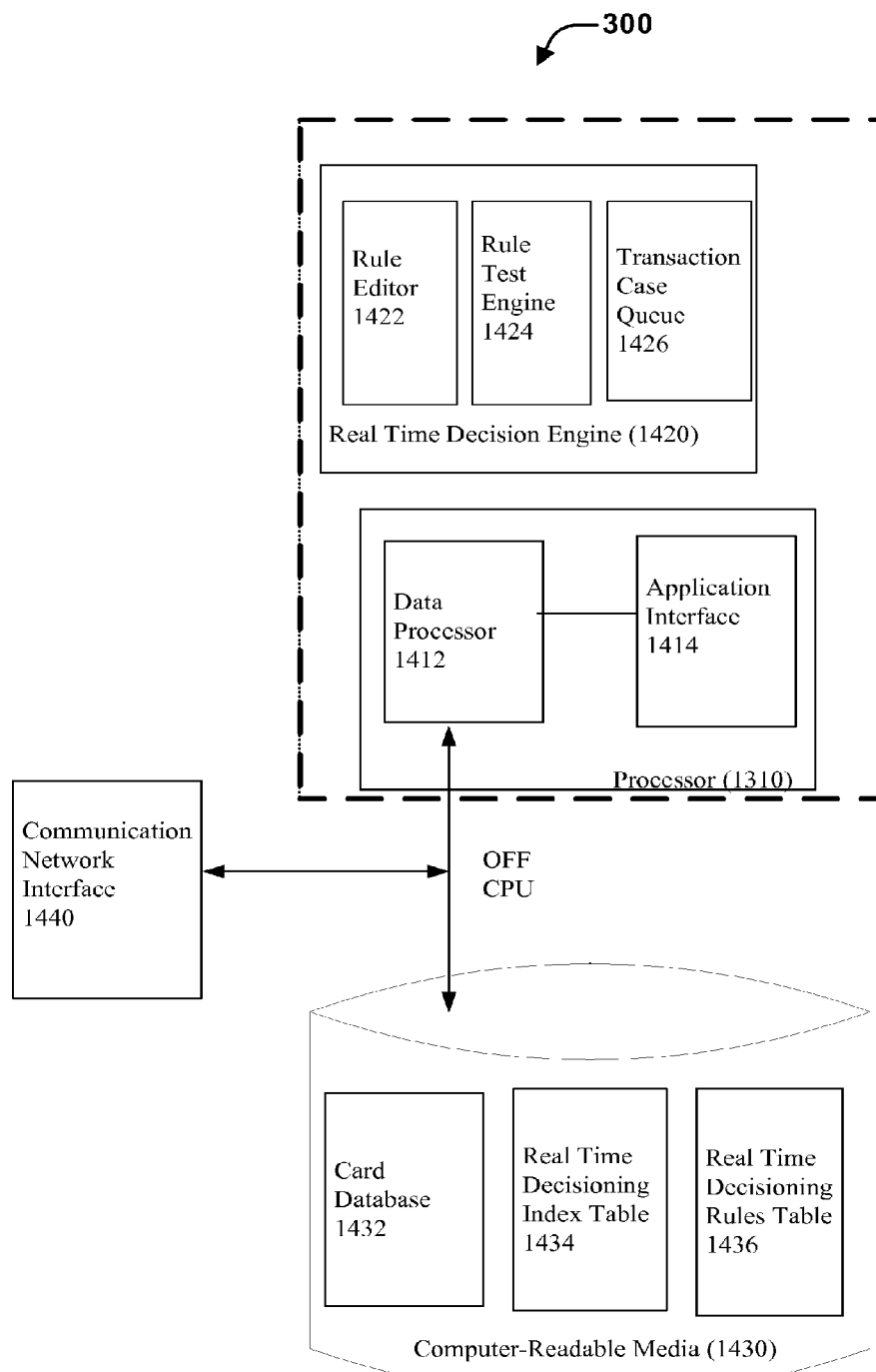
FIG. 3 shows an implementation of an issuer configured to upload fraud prevention rules to a payment processor that implements the rules in real-time.
Figure 4:
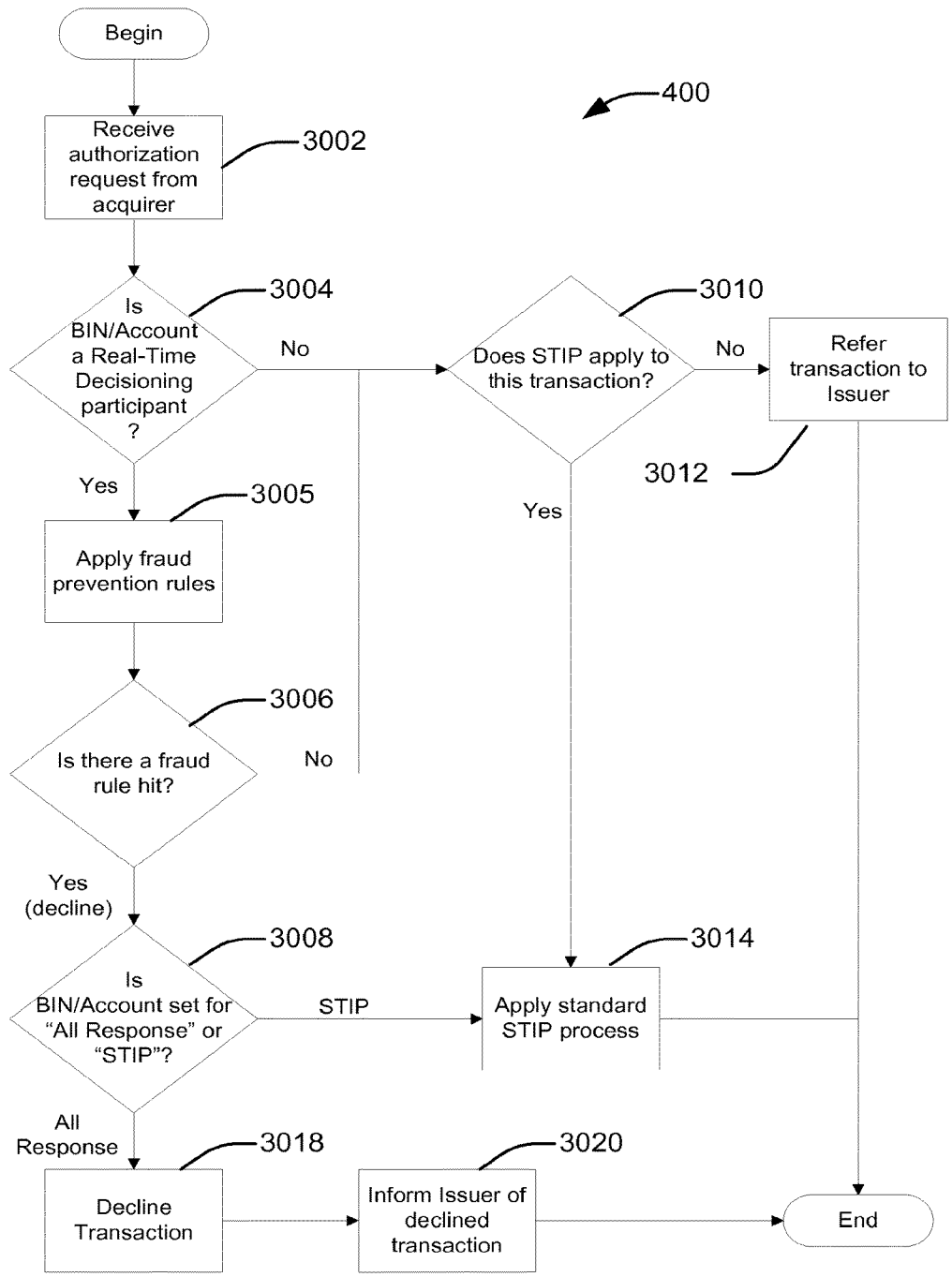
FIG. 4 is a flowchart of an exemplary method in which a payment processor implements fraud prevention rules received from an issuer and implements the rules in real-time.

As was previously mentioned, in some implementations, the issuer itself implements business rules that have been optimized by the service disclosed herein. In FIG. 3, however, a different implementation of an issuer 300 (seen in FIG. 19 as issuer (i) 1904) is illustrated. In the particular implementation of FIG. 4, issuer 300 is configured to upload fraud prevention rules to a payment processor that implements the rules in real-time. It is understood by those known in the art that the issuer computing device 1400 may be configured on any computing device, such as a workstation, personal computer, mini-computer, mainframe, or other computing device known in the art. For illustrative purposes only, we will assume that the computing device located at the issuer 300 is a computer workstation.

Issuer 300 may run a multi-tasking operating system (OS) and include at least one processor or central processing unit 1410. Processor 1410 may be any central processing unit, microprocessor, micro-controller, computational device or circuit known in the art. It is further understood that processor 1410 does not have to be the same model or make as processor 1310 (FIG. 2).

Like the functional elements of FIG. 2, it is well understood by those in the art, that the functional elements of FIG. 3 may be implemented in hardware, firmware, or as software instructions and data encoded on a computer-readable storage medium. As shown in FIG. 3, processor 1410 is functionally comprised of a real time decisioning engine 1420, data processor 1412, and application interface 1414. Verification engine 1420 may further comprise: rule editor 1422, rule test engine 1424, and transaction case queue 1426. These structures may be implemented as hardware, firmware, or software encoded on a computer readable medium, such as storage media 1430.

Data processor 1412 interfaces with storage medium 1430 and network interface 1440. The data processor 1412 enables processor 1410 to locate data on, read data from, and write data to, these components.

Network interface 1440 may be any data port as is known in the art for interfacing, communicating or transferring data across a computer network. Examples of such networks include Transmission Control Protocol/Internet Protocol (TCP/IP), Ethernet, Fiber Distributed Data Interface (FDDI), token bus, or token ring networks. Network interface 1440 allows issuer 300 to communicate with payment processor 200 (FIG. 2).

Application interface 1414 enables processor 1410 to take some action with respect to a separate software application or entity. For example, application interface 1414 may take the form of a graphical-user or windowing interface, as is commonly known in the art.

Computer-readable storage medium 1430 may be a conventional read/write memory such as a magnetic disk drive, floppy disk drive, compact-disk read-only-memory (CD-ROM) drive, digital versatile disk (DVD) drive, high definition digital versatile disk (HD-DVD) drive, magneto-optical drive, optical drive, flash memory, memory stick, transistor-based memory or other computer-readable memory device as is known in the art for storing and retrieving data. Significantly, computer-readable storage medium 1430 may be remotely located from processor 1410, and be connected to processor 1410 via a network such as a local area network (LAN), a wide area network (WAN), or the Internet. In addition, as shown in FIG. 3, issuer storage media 1430 may contain structures analogous with that of payment processor storage media 1330 (FIG. 2).

These structures include a card database 1432, a real time decisioning index table 1434, and a master real time decisioning rules database 1436. The function of these structures may best be understood with respect to the flowcharts of FIGS. 4-6, as described below.

Exemplary methods for preventing fraud are seen in FIGS. 4-7. It is understood by those known in the art that instructions for such method implementations may be stored on their respective computer-readable memory and executed by their respective processors.

Turning to FIG. 4, method 400 is depicts an implementation in which a payment processor 200 (FIG. 2) implements fraud prevention rules received from issuer 300 (FIG. 3) and implements the rules in real-time. Note, however, that the present application also contemplates implementations where it is the issuer that implements optimized fraud prevention rules that are received from an implementation of a business rule optimization service disclosed herein.

As discussed above in reference to FIG. 19, whenever a customer uses a payment card to pay for a financial transaction, the merchant, and, in turn, acquirer, seek authorization before performing the transaction. As can be seen in the illustrated implementation of FIG. 4, at block 3002, a payment processor, such as payment processor 200 (FIG. 2), receives an authorization request from an acquirer, such as acquirer (q) 1906 (FIG. 19). The authorization request contains a formatted data packet or packets containing information about the requested transaction, such as transaction amount, merchant name, and the customer's Primary Account Number (PAN). Usually, a customer's Primary Account Number is either a 15 or 16 digit number. The first six digits of a Visa® or MasterCard® Primary Account Number identifies the card issuer banking institution and is known as the "Bank Identification Number" or "BIN." In debit transactions, the authorization request may also contain a user verification identifier, such as the customer's personal identification number (PIN) or biometric information.

At decision block 3004, a transaction driver, such as transaction driver 1322 (FIG. 2), determines whether the account referenced by a Primary Account Number or the issuer, such as issuer 300 (FIG. 3), represented by the Bank Identification Number participate in the real time decisioning process. If not, flow continues to block 3010. When the account's Primary Account Number or the Bank Identification Number participates in the real time decisioning process, flow continues to decision block 3005. In some instances, the transaction driver 1322 may make its determination through identifying Primary Account Numbers or Bank Identification Numbers listed in a card database, such as card database 1332 (FIG. 2).

As can be seen at blocks 3005 and 3006, if the transaction driver determines the account participates in the real time decisioning process, a set of fraud prevention rules are applied to the transaction data to determine whether the transaction is fraudulent. Whenever the fraud prevention rules identify a fraudulent transaction, it is referred to as a "fraud rule hit" and a real time decisioning processor, such as real time decisioning processor 1326 (FIG. 2), marks the transaction for denial. In applying the fraud detection rules, the real time decisioning processor may apply fraud detection rules stored at a real time decisioning index table, such as real time decisioning index table 1334 (FIG. 2), or a real time decisioning rules table, such as real time decisioning rules table 1336 (FIG. 2). If no fraud is detected, flow continues at block 3010.

If fraud is detected, then, as indicated by block 3008, the rules processor determines whether the Bank Identification Number or Account is set for all responses or whether Stand In Processing ("STIP") should apply to this transaction. STIP is a backup system that provides authorization services on behalf of an issuer, such as issuer 300, when the issuer or its authorizing processor is unavailable. If the BIN or account is marked for STIP, flow continues to block 3014. If the BIN or account is marked for all responses, flow continues at block 3018.

At block 3018, the transaction driver declines the transaction. When the transaction is declined, the acquirer is informed that that the transaction is not authorized. Furthermore, transaction driver informs the issuer of the declined transaction, as indicated at block 3020 and method 400 ends.

As is indicated by block 3010, the transaction driver determines whether STIP applies to the transaction. If STIP does not apply to the transaction, flow continues at block 3012, where the transaction driver sends the transaction information to the issuer for approval or denial via a communication network interface, such as communication network interface 1340 (FIG. 2), and method 400 ends.

If STIP applies to the transaction, the process flow continues at decision block 3014, where STIP procedures are applied and the transaction is either approved or denied.

Figure 5:
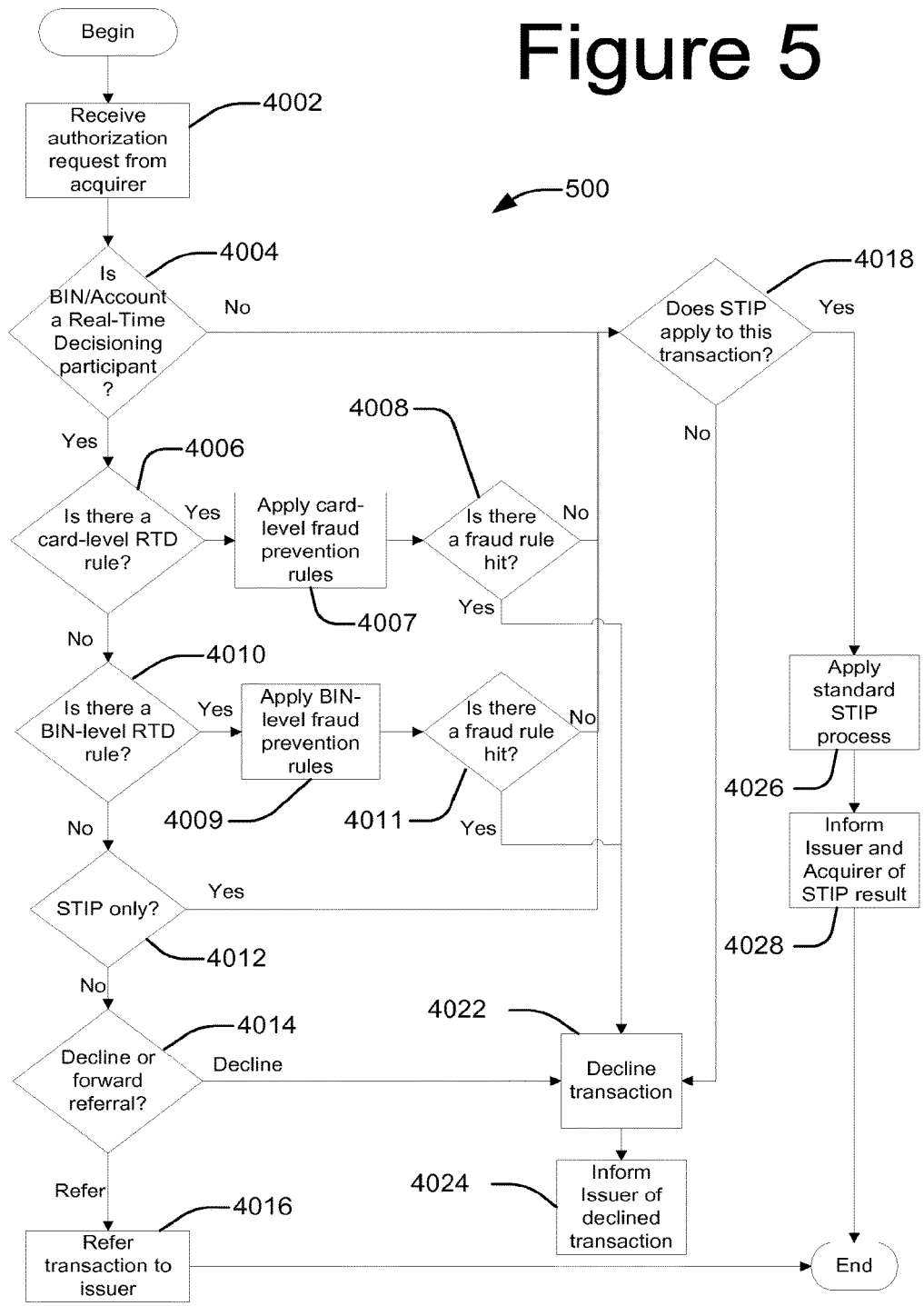
FIG. 5 is a flowchart of an alternate exemplary method in which a payment processor implements fraud prevention rules received from an issuer and implements the rules in real-time.

FIG. 5 is a flowchart of an alternate process 500 in which a payment processor, such as payment processor 200 (FIG. 2), implements fraud prevention rules received from an issuer, such as issuer 300 (FIG. 3), and implements the rules in real-time.

At block 4002, the payment processor receives an authorization request from an acquirer, such as acquirer (q) 1906 (FIG. 19). The authorization request may be formatted as discussed above at FIG. 3.

At decision block 4004, a transaction driver, such as transaction driver 1322 (FIG. 2), determines whether the account referenced by Primary Account Number or the issuer represented by the Bank Identification Number participate in the real time decisioning process. If not, flow continues at block 4018. When the Primary Account Number or the Bank Identification Number participates in the real time decisioning process, flow continues at decision block 4006.

At decision block 4006, a real time decisioning processor, such as real time decisioning processor 1326 (FIG. 2) decides whether there is a card-level real time decisioning rule that applies. Block 4006 may be accomplished when the real time decisioning processor matches a card's primary account number against an entry in a card database, such as card database 1332 (FIG. 2), a real time decisioning index table, such as real time decisioning index table 1334 (FIG. 2), or a real time decisioning rules table, such as real time decisioning rules table 1336 (FIG. 2). A card-level real time decisioning rule is any rule that applies to a specific primary account number. For example, as a rule for extremely high value cardholders, their card may never be declined. For other customers, their card may be declined whenever their purchase amount exceeds a fixed sum, or whenever their total card balance exceeds a certain amount.

If a card-level real time decisioning rule applies, flow continues at block 4007. As is indicated by blocks 4007 and 4008, the real time decisioning processor applies the rule and either approves or declines the transaction. If the transaction is approved, method 500 continues at block 4018. If the transaction is declined, flow continues at block 4022.

If no card-level rule applies, process 4000 determines whether there is a Bank Identification Numbers level rule, block 4010. If there is no BIN level rule, flow continues at block 4009; otherwise, flow continues at block 4012. As indicated by blocks 4009 and 4011, where the real time decisioning processor applies the rule and either approves or declines the transaction. If the transaction is approved, method 500 continues at block 4018. If the transaction is declined, flow continues at block 4022.

At decision block 4012, a check is made whether Stand in Processing is the only rule that should apply. If so, flow continues at block 4018. Otherwise, flow continues at block 4014.

At block 4014, a verification engine, such as verification engine 1320 (FIG. 2), determines whether the transaction should be forwarded to issuer 300 for final determination block 4016, or declined at block 4022.

Returning to block 4018, if no Stand in Processing applies to the transaction, as determined by a transaction driver, such as transaction driver 1322 (FIG. 2), flow continues at block 4022.

If the standard Stand in Processing procedure applies, it is applied at block 4026. Both the issuer and acquirer (FIG. 19) are informed of the STIP result, as indicated by block 4028, and the process ends.

Figure 6A:
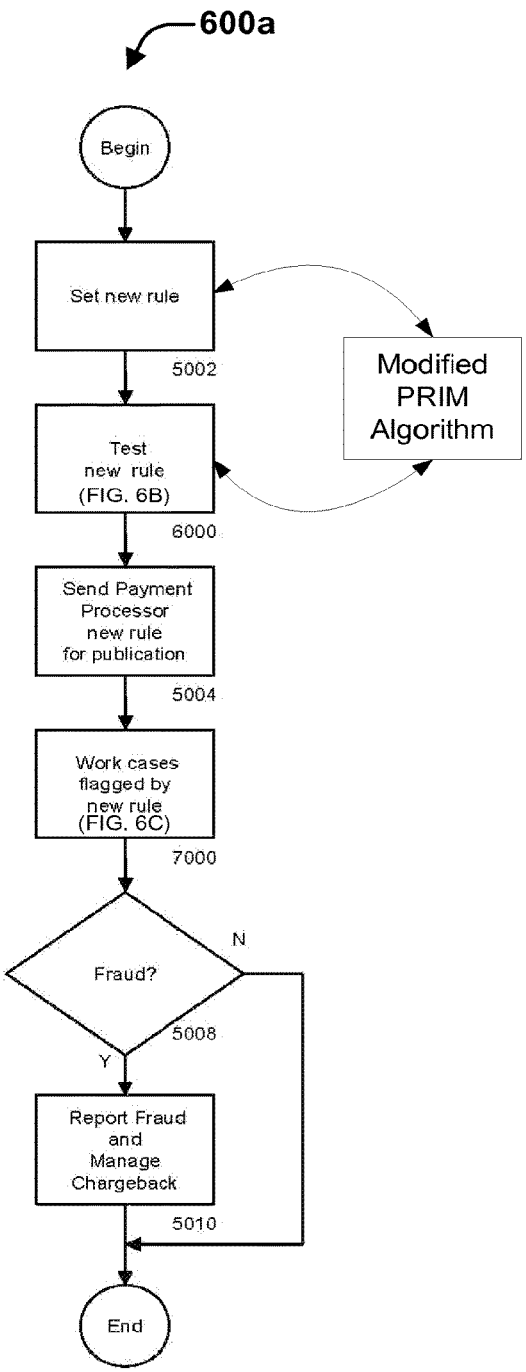
FIGS. 6A, 6B, and 6C depict three (3) exemplary methods in which an issuer, respectively, (i) implements, simulates and works fraud prevention rules; (ii) tests and verifies new fraud prevention rules; and (iii) works cases, determining whether there is fraud.

At block 4022, the transaction driver 1322 declines the transaction and the acquirer is informed that the transaction is not authorized. Transaction driver 1322 informs the issuer of the declined transaction, block 4024. Process 500 ends FIG. 6A depicts a method 600*a* in which an issuer, such as issuer 300 (FIG. 3), implements, simulates, and works fraud prevention rules. An issuer may create (block 5002) and test (block 6000) their own issuer-specific rules on their own data, where blocks 5002 and 6000 can used a modified Patient Rule Induction Method (PRIM) as described with respect to FIG. 11, below.

This data includes a local card database, such as card database 1432 (FIG. 3), a local real time decisioning index table, such as local real time decisioning index table 1434 (FIG. 3), and a local real time decisioning rules table, such as local real time decisioning rules table 1436 (FIG. 3). The rules may be created and modified by a rule editor, such as rule editor 1422 (FIG. 3). The rules are then tested with a rule test engine, such as rules test engine 1424 (FIG. 3), which is disclosed herein as a business rules optimizer service.

In various implementations, the business rules optimizer service uses operations research technology to determine which business rules are optimal. This optimization can be based upon the past transaction history of the issuer, and/or that of its peers, the nature of the system, the goals for improvement, and constraints on time and computing power. Moreover, the business rules optimizer service can also perform operations research analysis upon past transaction data from other transaction handlers. For example, a particular bank or financial institution can be issuing accounts to account holders for several different transaction handlers, such as two or more of American Express, Master Card, Diners Club, Visa, Discover Card, etc. As such, the business rules optimizer service will perform analysis upon the past transaction data of the particular bank or financial institution, as well as that of its peers, for each of these transaction handlers. By way of access to such a large collection of diverse transaction data, the optimizer service arrives at an optimized set of business rules that are to be used when deciding whether or not to authorize future transactions upon this issuer's accounts. As such, the issuer will be using an optimized set of business rules that is based upon a holistic analysis of its accounts across all of the transaction handlers with whom the issuer is in collaboration.

Goals that an issuer might wish to achieve in business rules optimization include a specific Real Time Decline ratio (RTD), a False Positive Rule (FPR), and/or a case creation ratio. The issuer may specify that the business rules optimizer service focus its analysis upon a particular time period, a program, debit products only (i.e., debit cards instead of credit cards), a particular product (i.e., Products—VISA classic gold), one or more Bank Identification Numbers (BIN) for the issuer, a group of BINs (BID) of the issuer, a particular geographic location, merchants dealing only in certain commodities, etc. Also, transactions of a certain category of peer-issuers may be part of the issuer's desired filtering criteria. The examination of peer-issuer transactions may help to better stop a type of fraud upon the issuer that has been tried upon one or more of its peer-issuers, as reflected in historical transaction data, thereby revealing patterns and trends of fraud.

Past transaction data of the issuer, and/or that of the issuer's peers, can be retrieved and analyzed to create statistics for patterns of fraud. Parameters for future transactions are then mathematically modeled against these statistics using variations of algorithms to arrive at optimal or near optimal business rules. These optimal or near optimal business rules can then be implemented for use in a process of authorizing the issuer's future transactions. For instance, the rules optimizer may analyze past transaction in order to set business rules that would maximize the number of the issuer's future low risk transactions that should be authorized while minimizing the number of authorized future transaction that would be fraudulent and should be denied authorization. In so doing, the rule optimizer would maximize the issuer's profit while minimizing the issuer's risk and/or fraud loss. The resultant optimized business rules would be directed to conditions under which the issuer would authorize, or not authorize, future transactions, and would also be directed to creating cases for further investigation of transactions to ascertain whether fraud took place. These resultant optimized business rules produce optimal Real Time Decline ratios (RTD), False Positive Rules (FPR), and case creation ratios. The FPR reflects a fraud mitigation rule to predict how much fraud can be prevented. The case creation ratio is a ratio of the number of further investigations of transactions which may or may not have been declined relative to all transactions.

After the rules optimizer has performed, the issuer may further adjust the optimized business rules. The issuer can use its own intuition to further adjust business rules optimized by the rule engine at block 6000, as will be discussed further in connection with FIG. 6B. Any such adjustment may be based upon the issuer's subjective judgment, intuition, or objective or non-objective criteria not necessarily included in the rules optimizer service. Thereafter, the optimized rules may either be implemented by the issuer, and/or uploaded to a payment processor, such as payment processor 200 (FIG. 2), for implementation at block 5004. As indicated by block 7000, when cases are flagged for inquiry by payment processor (such as at block 4016 of FIG. 5), cases are examined by issuer's employees ("worked") at a transaction case queue, such as transaction case queue 1426 (FIG. 3) to determine whether the transaction should be declined for fraud. The process of examining such transactions is further described in relation to FIG. 6C. As is indicated by block 5008 and 5010, if the transaction should be declined, the fraud is reported and a chargeback is managed.

In a further implementation, the issuer may submit one or more ad hoc requests to a rules optimizer service. The rules optimizer service will apply various optimization techniques to the issuer's past transaction data, as well as to other issuers' transaction data, to vet the ad hoc request submitted by the issuer and produce an optimized set for rules in response to each such issuer ad hoc request. For example, the issuer may submit an ad hoc request to develop a set of business rules for authorizing certain kinds of transactions having certain ranges of risk scores for merchants selling certain kinds of commodities in a certain geographic location. The issuer's submitted request may further specify that, not only should the issuer's own transaction data be analyzed, but the analysis should be extended to also include past transaction data of other issuers that are similar in number of transactions, volume of transactions, and geographic location. Stated otherwise, the rule optimizer service is to analyze the proposed parameters against the issuer's own transaction data as well as against that of its peer-issuers. In application of the foregoing, the issuer creates (block 5002) and tests (block 6000) their own issuer-specific rules on their own data, and/or that of their peers, by submission of same to a rules optimization service as described herein. Transaction data from the issuer's peers can be stored in a local card database, such as card database 1432 (FIG. 3), a local real time decisioning index table, such as real time decisioning index table 1434 (FIG. 3), and a local real time decisioning rules table, such as real time decisioning rules table 1436 (FIG. 3). The rules may be created and modified by a rule editor, such as rule editor 1422 (FIG. 3). After the rules have been tested with a rule test engine at block 6000, which forms all or a portion of the rules optimizer service, the vetted and optimized rules may then either be implemented by the issuer and/or be uploaded to a payment processor, such as payment processor 200 (FIG. 2), for implementation, block 5004.

Figure 6B:
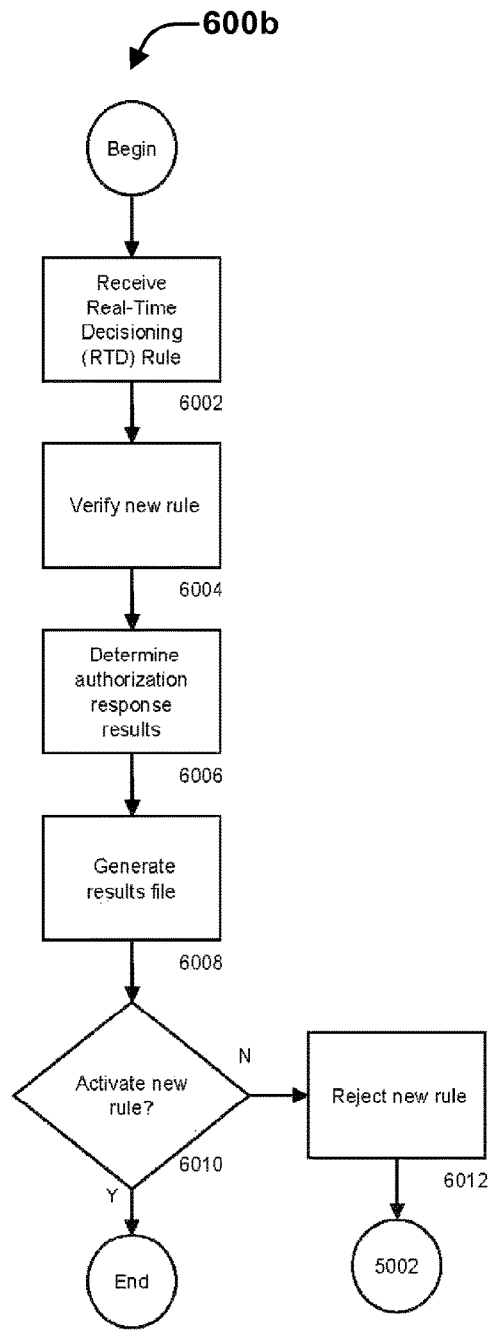

The process of testing and verifying new fraud prevention rules by the issuer is described by block 6000 and is further illustrated by method 600b of FIG. 6B. At block 6002, a rule test engine, such as rule test engine 1424 (FIG. 3), receives the real time decisioning rule. The real time decisioning rule may be received directly from a rule editor, such as rule editor 1422 (FIG. 3), and a real time decisioning rules table, such as real time decisioning rules table 1436 (FIG. 3). The rule is verified against sample fraudulent transaction data, block 6004, and the authorization responses are output, block 6006. In some implementations the results are generated as a file, block 6008. By comparing the results against the known sample data, the issuer determines whether the rule is useful. If useful in detecting fraudulent transactions, the new rule is activated, block 6010. If the rule is not useful, it is rejected at block 6012, and the process flow returns to block 5002 of FIG. 5.

Figure 6C:
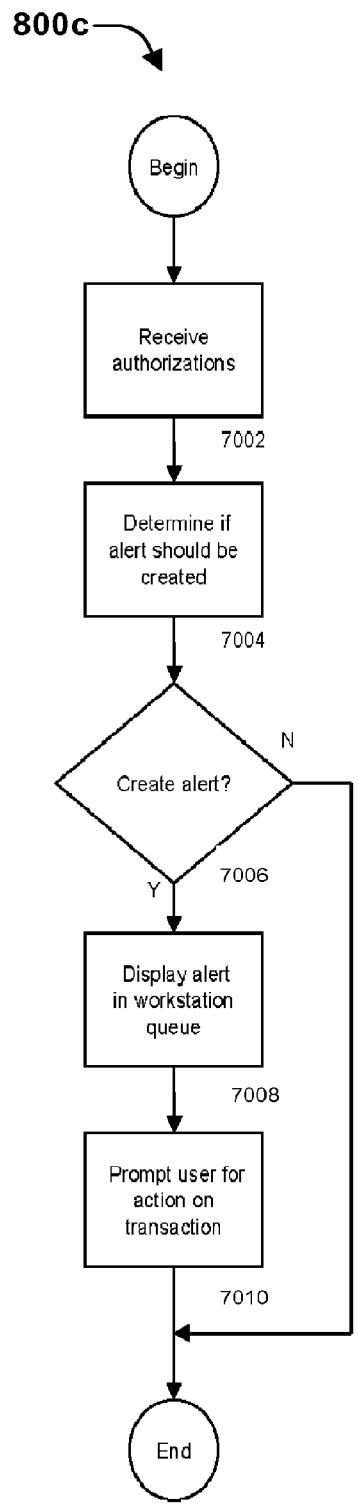

The process of working a case represented by block 7000 is further described in detail by method 600c of FIG. 6C. At block 7002, a transaction case queue, such as transaction case queue 1426 (FIG. 3), receives a list of authorized transactions. The issuer determines whether an alert should be created, as indicated by blocks 7004 and 7006. An alert may need to be created if the transaction case queue received a transaction that is suspicious, or needs human intervention. If no alert is needed, flow ends. If an alert is needed, as determined by decision block 7004, an alert is displayed in the workstation transaction case queue, block 7008, prompting a user for action on the transaction, block 7010.

Figure 7:
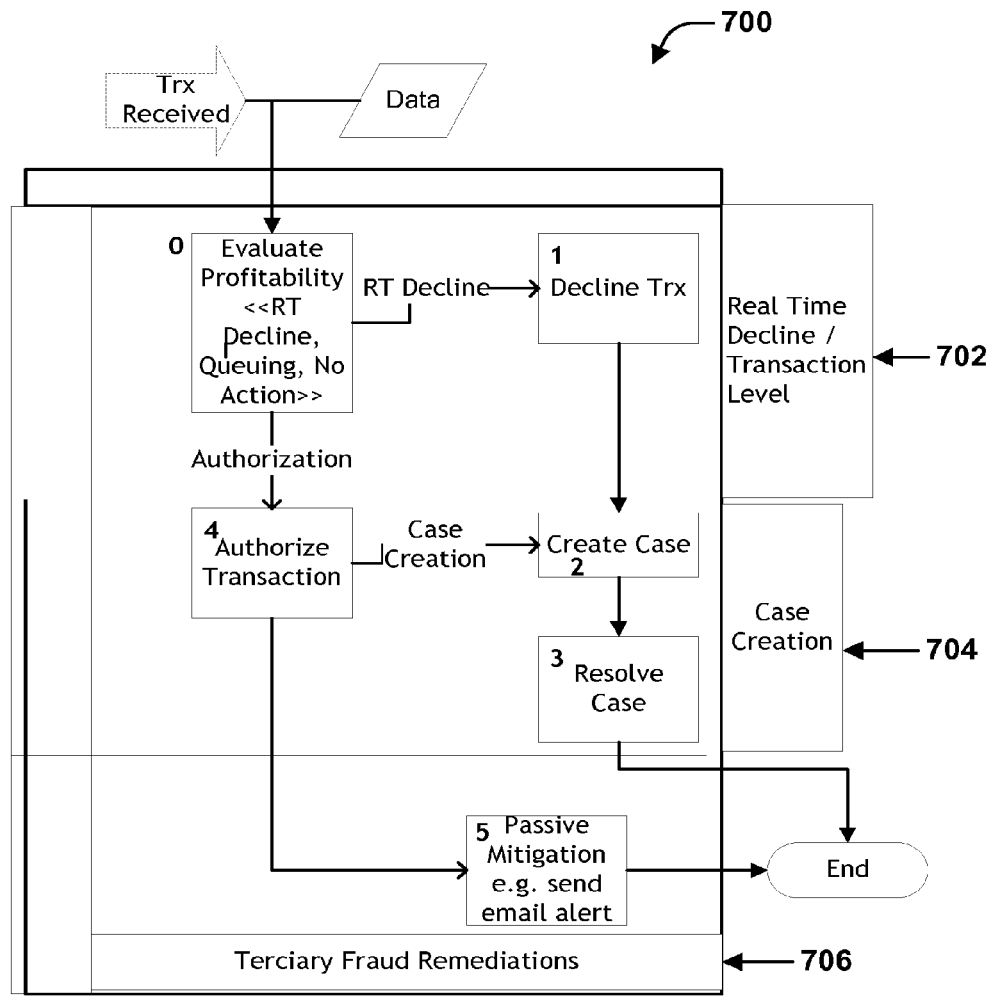
FIG. 7 is a flowchart showing an exemplary method for processing a transaction through the stages of Real Time Decline/Transaction Level, Case Creation, and Tertiary Fraud Remediation.

FIG. 7 shows a flowchart depicting a method 700 by which a transaction is received and processed according to business rules that have been optimized by the optimization service disclosed herein. The received transaction carries data that is subjected to various tests of the optimized business rules. At step 702, a Real Time Decline/Transaction Level process is performed. In this process, at sub-step 0, an evaluation is made as to the profitability of (i) a real time (RT) decline; (ii) queuing the transaction for further analysis; or (iii) taking no action. If the optimized business rules show that there should be a real time decline to authorize the received transaction, then the transaction is declined at sub-step 1 and the process moved to sub-step 2 of step 704. If the optimized business rules show that the transaction is to be authorized, the process moves to sub-step 4 of step 704.

At sub-step 2, in a case creation process, a case is created to further investigate the transaction for potential fraud. At sub-step 3, the investigation is concluded and the case is resolved to end the process.

Even though the transaction is authorized, the process optimized business rules may show that a case is to be created for the transaction, which is seen in the flowchart of FIG. 7 where sub-step 4 moves to sub-step 2 and proceeds as above. In a Tertiary Fraud Remediation process of the flowchart in FIG. 7, a passive fraud mitigation step can be performed, as indicated by sub-step 5 of step 706. A passive fraud mitigation step can be as simple as forming, addressing, and sending an alert, such as an electronic mail (e-mail) alert, to one or more appropriate recipients, should the optimized business rules so warrant the handling of the received transaction.

Figure 8:
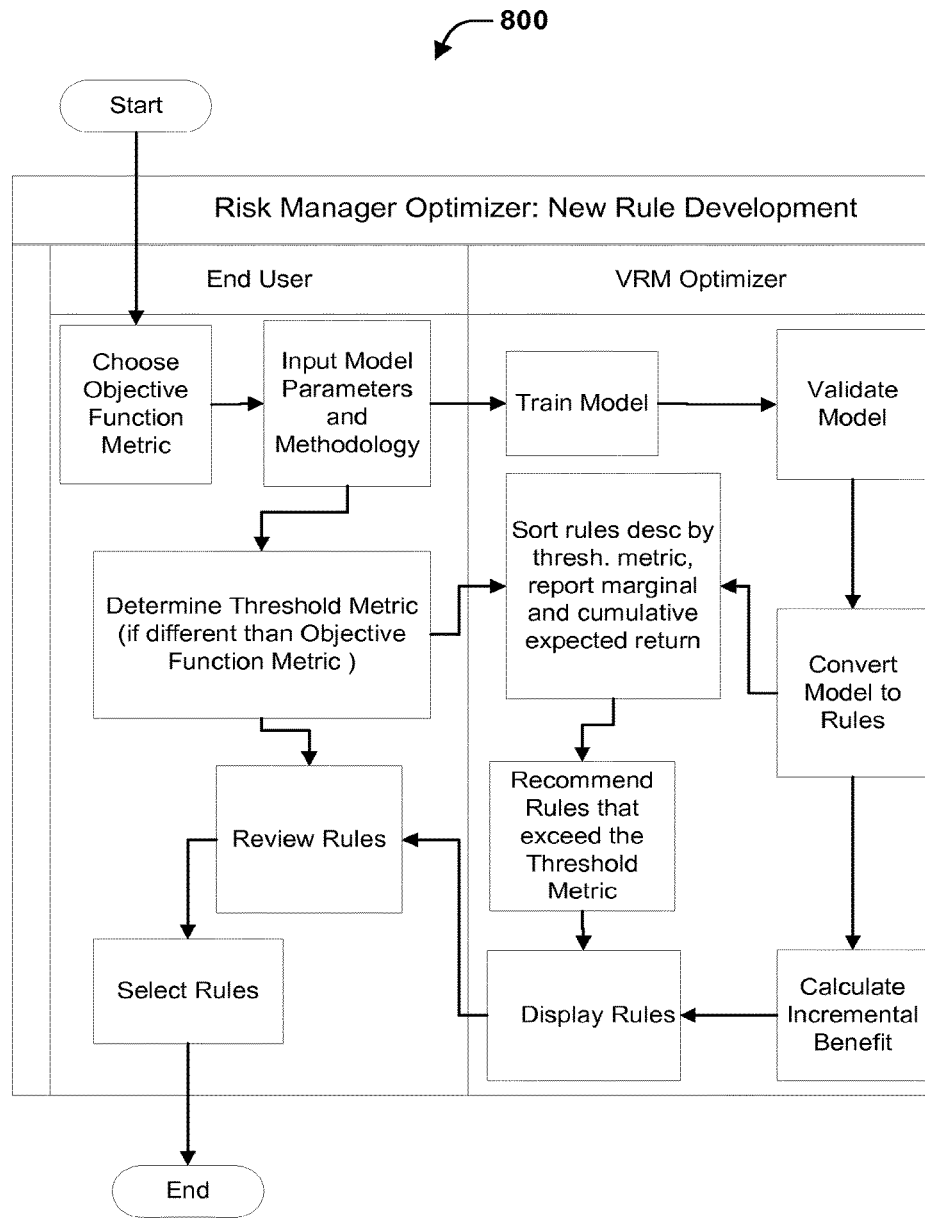
FIG. 8 is a flowchart showing an exemplary method for developing new fraud reduction rules with steps being performed by an end user and a rules optimizer.
Figure 9:
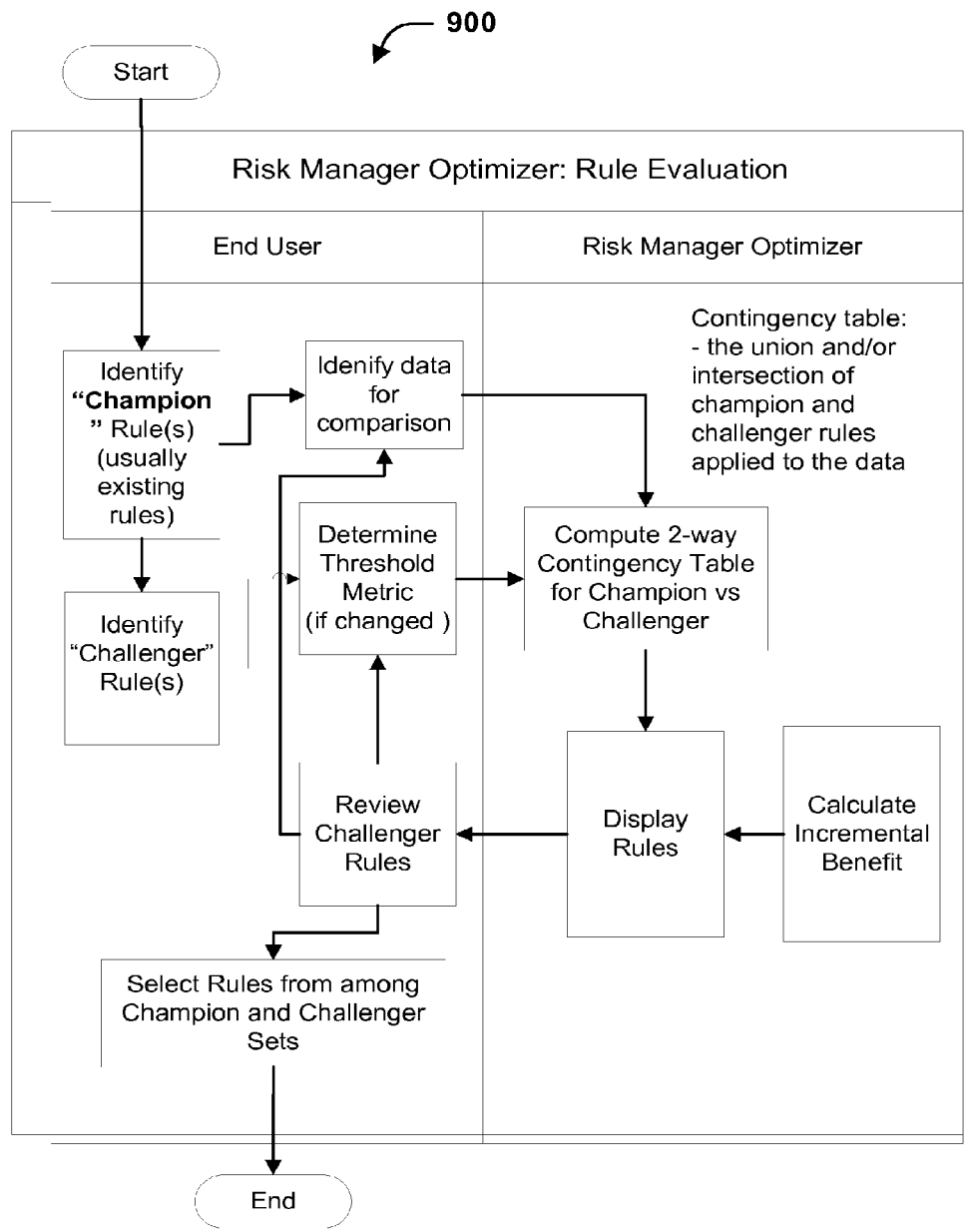
FIG. 9 is a flowchart showing an exemplary method for evaluation of a rule for reducing fraud with steps being performed by an end user and a rules optimizer.

Operations research, as was disclosed above, relative to methods flowcharted in FIGS. 6A-6C, is also contemplated in various implementations of a method 800 of FIG. 8 for new business rule development, and in a method 900 of FIG. 9 for rule evaluation. In particular, FIG. 8 shows a flowchart depicting method 800 by which a risk manager optimizer ('VRM optimizer') and an end user can perform steps collaboratively to optimize a new business rule for the treatment of a transaction that is received and processed as set forth in FIG. 7. To start, the end user chooses an objective function metric, and inputs model parameters and methodology. Unless the user determines a threshold metric (if different than the objective function metric), then the VRM optimizer proceeds with the method 800.

Upon receipt from the end user's model parameters and methodology, the VRM optimizer trains the model, validates the model, and then converts the model to business rules. Incremental benefits of the business rule are calculated. These business rules are sorted according to threshold metrics. A report can be made as to the marginal and cumulative expected return from an implementation of the business rules. Thereafter, a recommendation is made where the business rules are found to exceed the user's threshold metric(s).

Following either the calculation of incremental benefits or the recommendation as to the exceeding of threshold metric(s), the rules are displayed for the end user's review. The end user may then select to implement the optimized rules, after which method 800 ends. As was mentioned above, implementations include both the issuer and the payment processor implementing the optimized business rules.

Note that FIGS. 7-8 can used a modified Patient Rule Induction Method (PRIM) as described with respect to FIG. 11, below.

FIG. 9 shows a flowchart depicting method 900 by which the VRM optimizer and the end user can perform steps collaboratively to evaluate a new business rule for the treatment of a transaction that is received and processed as set forth in FIG. 7.

To start, the end user identifies one or more "champion" business rules, usually existing rules, that are to be optimized. Data to be used for comparison is identified. The risk manager optimizer then makes computations using (i) a threshold metric determined by the end user; and (ii) the data identified by the end user for the comparison. The results of the computations can be rendered as a two-way contingency table for the champion business rule versus a challenging business rule to determine which produces more favorable metrics. The two-way contingency table will be the union and/or the intersection of champion and challenger business rules as applied to the data that was identified for the comparison by the end user.

Following either a calculation of incremental benefits of the business rule being evaluated or the computation of the two-way contingency table, the rules are displayed for the end user's review. The end user may then review the challenger business rule and identify new data to be used for comparison, after which the above process is repeated by the risk manager optimizer. If not, the end user selects business rules from among the champion and challenger sets of one or more business rules. Following the forgoing applied objective algorithms and metric, the end user is also allowed to apply subjectivity and intuition to further enhance the optimized business rules that are to be implemented. Then, method 900 ends.

Figure 10:
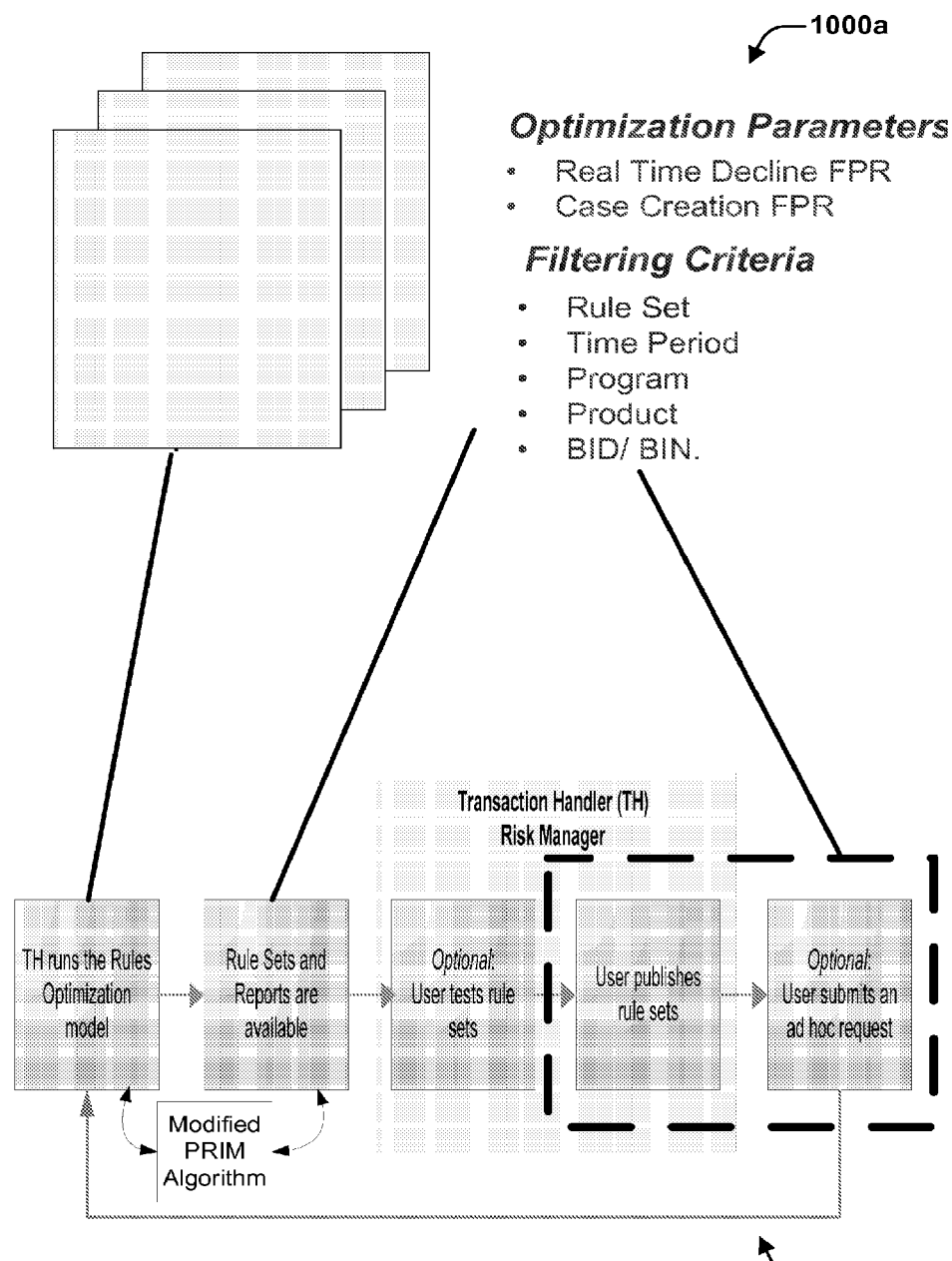
FIG. 10 is a schematic depicting the flowchart of FIG. 1B and steps in the depicted method where parameters and filters are used to optimize business rules for reducing fraud in transactions in a payment processing system.

FIG. 10 shows the method 1000b of FIG. 1 wherein the right-most process set is an optional step for a user to submit an ad hoc request which may further optimize business rules for handling transactions in a payment processing system so as to reduce fraud. The user request will include both optimization parameters and a desired filtering criteria. The purpose of this request is to identify rules that target specific segments of transactions. For instance, the segment of interest could be only the past six (6) months of transaction data, such that the analysis will weight more heavily on recent trends.

Statistics that the business rules optimizer service should optimize may include a goal to achieve a preferred Real Time Decline ratio (RTD) and/or False Positive Rule (FPR), which reflect a fraud mitigation rule to predict how much fraud can be prevented, and a case creation ratio (i.e., further investigation of a transaction which may or may not have been declined). The filtering criteria can include a set of business rules, a time period, a program, a product (i.e., Products—VISA classic gold) a Bank Identification Number (BIN) for the issuer, and/or a group of BINs (BID) of the issuer.

The filtering criteria may also consider past transactional data from only a limited geographic location or merchants dealing only in a certain commodity, or only debit products (i.e., debit cards instead of credit cards). Also, transactions of a certain category of peer of an issuer may be part of the issuer's desired filtering criteria. The examination of issuer peer transactions may help to better stop a type of fraud upon the issuer that has been tried, as reflected in historical transaction data, upon the issuer's peers to see patterns and trends of fraud.

Modified Patient Rule Induction Method (PRIM)

The Patient Rule Induction Method (PRIM) is a technique of enclosing input data points within a single hyper-rectangle, where each edge of the hyper-rectangle is associated with an input variable. Once enclosed, small strips, or sub-rectangles, on each edge of the hyper-rectangle are "peeled" away until a pre-defined number of points remain inside the hyper-rectangle. Each particular sub-rectangle chosen for removal is the one that yields the largest mean value of the target variable within the hyper-rectangle. The points remaining within the hyper-rectangle are assumed to be predominantly high value points. Sub-rectangles are then added back, or 'covered or 'pasted,' along each edge of the hyper-rectangle until the mean value begins to decrease. The resulting hyper-rectangle can then be described by rules of the type: If: condition-1 and . . . and condition-n then: estimated target variable value. For an analytical description of PRIM and the algorithms it employs, see Friedman, J. et al., *Statistics and Computing*, 9:2, PP. 123-143 (April 1999), herein after "Friedman", which is incorporated herein by reference.

The PRIM algorithm presents significant implementation deterrents when applied to large, complex datasets—i.e.; those where data in the data set is scattered through high dimensional space, typically called 'Sparse', as a new dimension is needed to describe a continuous variable for each level of a categorical variable. As such, the PRIM algorithm lacks scalability. Scalability is described by the increase of computational cost (usually time) when the number of new records or complexity is increased. While the algorithm scales approximately linearly, O(n), with respect to new records, it suffers from quadratic, $O(n^2)$, scalability with increasing complexity/dimensionality.

As described above, the PRIM algorithm employs a search/optimization methodology, by which uninteresting regions of the dimensional space are peeled away and interesting regions are pasted back. This is done recursively to find local optimums. For each step of the recursion, each dimension must be examined for its affect of peeling or pasting. The most/least desirous dimension is added/removed until there are no remaining dimensions. The remaining region characterizes a local optimum. This is then repeated to find another local optimum. The quadratic complexity ($O(n^2)$) derives from the fact that at each removal of a (part of) a dimension, each remaining dimension must be examined.

Another problem arises from high dimensionality data that yields complex rules, i.e. rules with many conditions or values within those conditions. This decreases the interpretability of the rules. This implementation problem, inherent in the PRIM algorithm, is due to each peeling step introducing one condition into a final rule. Thus, while the pasting steps remove conditions, the vast majority of the PRIM algorithm is usually peeling and introducing conditions.

The foregoing significant problems and difficulties with the PRIM algorithm conclusively demonstrate that PRIM does not scale to complex data sets. An example of a complex data set is information pertaining payment transactions in a payment processing network, where that data set is used to determine fraud reduction using transaction authorization rules to deny authorization of such transactions. In that derivations of transaction authorization rules necessarily require the use of a complex data set of past transactions in a payment processing system, strategists would be discouraged from using a PRIM algorithm to determine transaction authorization rules for fraud reduction. The present application teaches implementations of a modified PRIM algorithm to solve the PRIM algorithm's inherent and significant implementation problems with complex data. These teachings can be used to determine a set of transaction authorization rules that can be used to deny or authorize transaction so as to reduce fraud. In particular, the transaction authorization rules are based on data driven models where convergence is guaranteed in linear time and the complexity of the algorithm scales as ~O(n).

Figure 11:
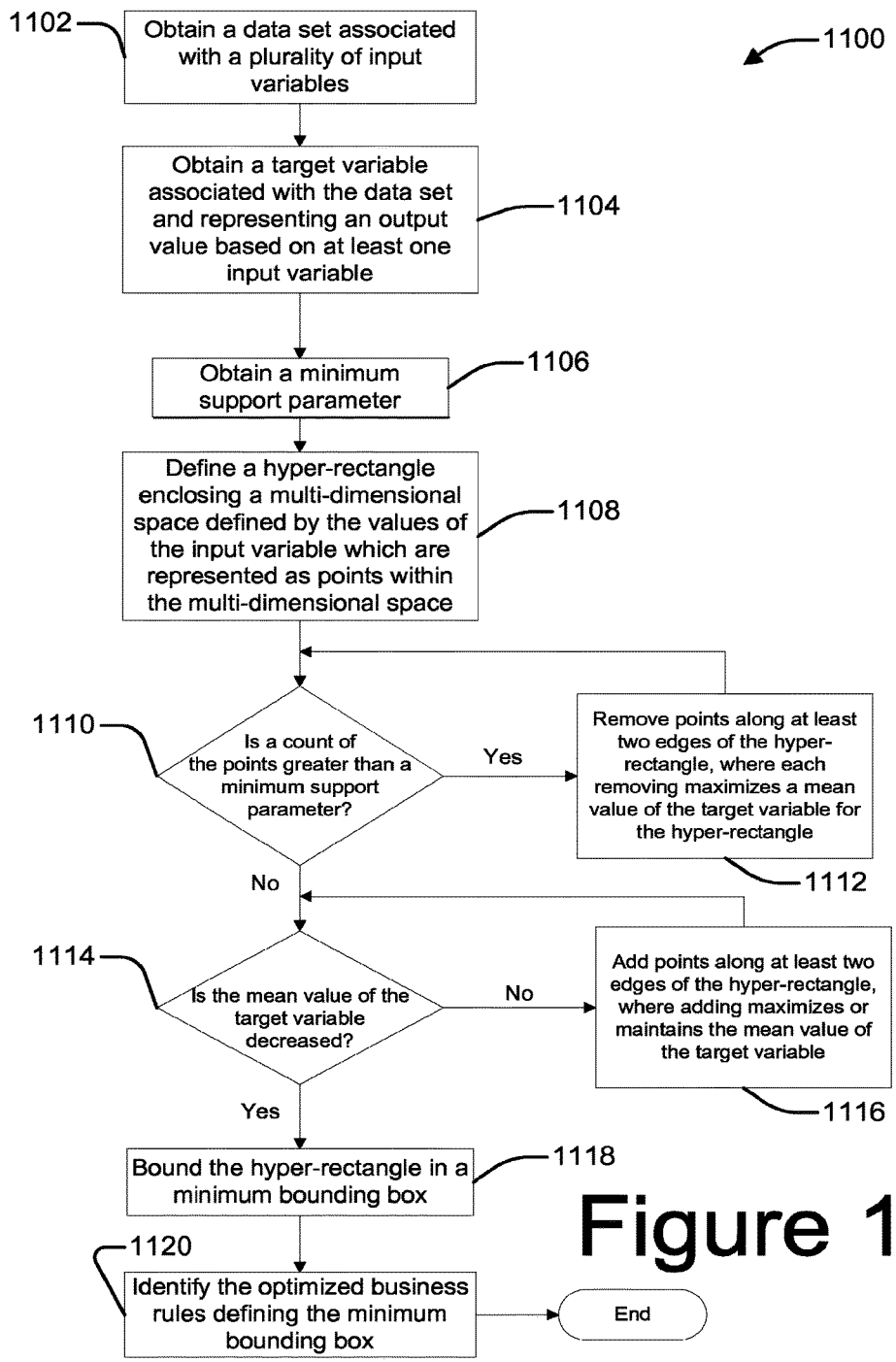
FIG. 11 is a flowchart showing an exemplary method for generating an optimized business rule set for transaction fraud prevention by use of a modified Patient Rule Induction Method (PRIM)

By way of example, and not by way of limitation, FIG. 11 presents an exemplary method 1100 for identifying and optimizing business rules to prevent fraud by use of a modification of the PRIM algorithm to determine a set of business rules for a fraud reduction. In particular, method 1100 utilizes a modified Patient Rule Induction Method (PRIM) to address the issue of determining, in a multidimensional space, a set of input variables that correspond to a high average for an output variable. The modified PRIM algorithm, as illustrated in FIG. 11, speeds up the convergence, as compared to a typical PRIM algorithm, by inhibiting some of the patience. Specifically, at each iteration, concurrent peeling or pasting of more than one dimension is allowed. By selecting a suitable fraction of dimensions to be peeled or pasted at each step, convergence is guaranteed in linear time and the complexity of the algorithm scales as ~O(n). Furthermore, the modified PRIM algorithm further remedies the disadvantage associated with the complexity of the rules resulting from the standard PRIM algorithm when applied to multidimensional data by applying a minimum bounding box to the data described by each rule. By doing so, the business rule set is reduced to its lowest possible complexity.

One implementation includes removing (or 'peeling'), while a count of the points within the hyper-rectangle is greater than a minimum support parameter, a first plurality of points close to the hyper-rectangle's edge, where each removing (or 'peeling') maximizes a mean value of the target variable, and then, while the mean value remains maximized, adding (or 'covering' or 'pasting') a second plurality of points close to the hyper-rectangle's edge, where each adding maximizes or maintains the mean value. The method further includes bounding the hyper-rectangle within a minimum bounding box and identifying the authorization business rules defining the minimum bounding box. Alternatively, the removal ('or peeling') and addition (or 'covering' or 'pasting') of the points does not have to be based on the maximizing the mean value. Although points can be added, points are not required to be added so as to maximize or maintain the mean value. Rather, the mean value can actually decline so long as it the mean value does not fall below a predetermined threshold. The authorization business rules that are identified as defining the minimum bounding box. The minimum bounding box can be thought of as containing point. The points that are within the final box define a subspace defined by only those dimensions involved in the removal ('or peeling') and the addition (or 'covering' or 'pasting') of the points. Those values not involved in peeling or covering are omitted from the authorization business rules that are identified as defining the minimum bounding box.

As shown in FIG. 11, and central to method 1100, is to construct a box B within which the target mean $$\bar{f}_b = \int_{x \in B} f(x)p(x)dx \int_{x \in B} p(x)dx$$

that is as large as possible. The algorithm used in method 1100 is a modified PRIM algorithm wherein top-down successive refinements are followed by bottom-up recursive expansion. To begin, the relevant data set is derived from transactions in a payment processing system. Each such transaction is conducted on an account issued by an issuer to an account holder, where the account holder conducts the transaction with a merchant having an acquirer, an example of which is seen in FIG. 19 as described herein. The payment transaction information in the data set is associated with multiple input variables, as indicated in block 1102. As indicated by blocks 1104 and 1106, a target variable associated with the dataset and representing an output value based on at least one of the input variables and a minimum support parameter, $\beta_0$, are obtained. The target variable is the value that is being maximized (or minimized) by the algorithm. By way of example and not limitation, if the goal of the optimization is to generate a rule that declines only those transactions where fraud is most likely, then the target variable would be a categorical variable representing that either a transaction is fraudulent (y=1) or not fraudulent (y=0). Thus, if $S_j$ denotes the domain of $x_j$(j=1, . . . , p), where $x_1, x_2, \ldots x_p$, denote the input variables for the collection p, and the input space of the data set is $$S = S_1 \times S_2 \times \ldots \times S_p$$

then the objective is to find a subregion $R \subset S$ for which $$\bar{y}_R \gg \bar{y}.$$

The rule generated would indicate, when met, that a transaction is most likely to be fraudulent and should be declined.

The minimum support parameter $\beta_o$ represents the a fraction of the total points from the data set that must remain in the hyper-rectangle, also referred to as a box, at the end of the peeling and pasting steps, as described below. The value of the minimum support parameter $\beta_o$ may involve both statistical and problem domain dependent considerations.

Once the data set, target variable y, and minimum support parameter $\beta_o$ are obtained, a hyper-rectangle is defined enclosing a multi-dimensional space defined by the values of the input variables, which are represented as points within the multi-dimensional space, as indicated by box 1108. More specifically, if $s_i \subseteq S_i$, then the hyper-rectangle is defined as $$B = s_1 \times s_2 \times \ldots \times s_p$$

where $x \in B \equiv \cap_{j=1}^{p}(x_j \in s_j)$.

As indicated by boxes 1110 and 1112, while a count of the points within the hyper-rectangle B is greater then the minimum support parameter $\beta_o$, points forming subboxes $b_{1 \ldots n}$ of the hyper-rectangle B are removed, or "peeled", where each subbox b is defined by a single input variable $x_j$, and where each cycle of removing maximizes a mean value of the target variable y for the hyper-rectangle. Thus, the particular subboxes $b^*_{1 \ldots n}$ removed each cycle, are those that together yield the largest output mean value within the next box $B - b^*_{1 \ldots n}$ $$b^*_{1\ldots n} = \underset{b_{1\ldots n} \in C(b_{1\ldots n})}{\arg\max} \; ave[y_i \mid x_i \in B - b_{1\ldots n}]$$

where $C(b_{1 \ldots n})$ represents the class of potential subboxes $b_{1 \ldots n}$ eligible for removal. Depending on the variable concerned each subbox is defined as follows: for numeric variable $x_j$:

$$b_{j-} = \{x \mid x_j < x_{j(\alpha)}\},$$

$$b_{j+} = \{x \mid x_j > x_{j(1-\alpha)}\}$$

and for categorical variable $x_j$:

$$b_{jm} = \{x \mid x_j = s_{jm}\}, \; s_{jm} \in S_j,$$

where $x_{j(\alpha)}$ is the $\alpha$-quantile of the $x_j$-values for data within the current box, and $x_{j(1-\alpha)}$ is the corresponding $(1-\alpha)$-quantile. Typically $\alpha$ is very small ($\alpha \leq 0.1$) so that in each step only a small part of the data points in the current hyper-rectangle B are removed.

The current hyper-rectangle B is then updated $$B \leftarrow B - b^*_{1 \ldots n}$$

and the procedure is repeated on the new, smaller hyper-rectangle.

As will be appreciated by one of ordinary skill in the art, the removing, or "peeling," creates a sequence of hyper-rectangles, with each hyper-rectangle obtained by peeling a part of the predecessor hyper-rectangle away. At each point, the portioned selected to be peeled is that portion that results in the highest mean target value of the successive hyper-rectangle. Thus, the boundaries of the resulting hyper-rectangle are determined without knowledge of later peels that further refine the boundaries on the other input variables. It is therefore possible that the final hyper-rectangle can be improved by readjusting some of its boundaries. This is done through a "pasting" or adding procedure.

The pasting procedure is basically the reverse of the peeling procedure. Once the count of the points within the hyper-rectangle equal the minimum support parameter $B_o$, points forming subboxes $b_{1 \ldots n}$ of the hyper-rectangle B are added until the mean value of the target variable $\bar{y}_{B+b^*}$ begins to decrease, as indicated by blocks 1114 and 1116. As before, each subbox b is defined by a single input variable $x_j$. Thus, the hyper-rectangle B is iteratively enlarged by pasting onto it small subboxes $b^*_{1 \ldots n}$, $B \leftarrow B \cup b^*_{1 \ldots n}$. The particular subboxs $b^*_{1 \ldots n}$ added each cycle are those that together maximize the mean value of the target variable over the new, larger hyper-rectangle and are selected from the eligible class be $b \in C(b)$.

Once the peeling and pasting is done, the resulting hyper-rectangle may be described by a set of substantially complex business rules. To reduce this complexity, method 1100 bounds the hyper-rectangle within a minimum bounding box, as indicated by block 1118. The minimum bounding box of the hyper-rectangle is the box with the smallest measure (hyper-volume) within which all the points lie. As indicated by block 1120, the optimized business rules are those that define the minimum bounding box. Alternatively, any variable can be omitted for which peeling and pasting was not involved as these are considered unimportant to the convergence.

The method 1100 depicted in FIG. 11 allows the adding (or 'covering' or 'pasting') until a threshold is reached, whereas applications of the teaching of Friedman leave all the resultant boxes too small or having failed to define actionable authorization business rules. The method 1100 depicted in FIG. 11 is similar to Friedman relative to the removing (or 'peeling'), but not as to the adding (or 'covering' or 'pasting'). Thus, the stopping criteria of method 1100 depicted in FIG. 11 for is different from the teaching of Friedman.

Reports 1200a, 1200b, and 1200c are seen in FIG. 12. These reports demonstrate a performance of optimized business rule sets. For an implementation of the optimized business rules, these reports show: (i) how much fraud would have been prevented; and (ii) the False Positive Rules (FPR) that would be achieved (i.e., where a FPR of 5:1 means that for every five (5) proper declines to authorize a transaction, there would be one (1) transaction that should have not been declined or was falsely declined.

Report 1200a is a report of two (2) business rule sets as illustrated. Report 1200b is a report summarizing a time period of 2.5 million transactions for a rule set resulting in an FPR of 5:1 for RTD and 15:1 for Case Creation. This RTD of 5:1 triggered 600 transactions or 4%, with 100 transactions being fraudulent or 10% for a total fraud amount of $950,000 US. This case creation of 15:1 triggered 14,400 transactions or 96%, with 900 transactions being fraudulent or 90% for a total fraud amount of $1,425,000 US. The authorization approval for this rule set was for the approval of 250,000 transactions, 50 of which were fraudulent and the fraud amount was $150,000 US.

Report 1200c summarizes a more detailed analysis for a particular business rule set.

FIG. 13 shows reports 1300a and 1300b of aggregated opportunities likely to be available to an issuer who implements certain optimized business rules for approving their transactions in a payment processing system. Report 1300a summarizes the aggregate authorization (AA) approval opportunity for Real Time Declines (RTD). The spreadsheet of report 1300a shows, for various risk scores, the cumulative number of non-fraudulent (good) transactions, the cumulative number of non-fraudulent (good) accounts, the cumulative amount of non-fraudulent (good) transactions, the cumulative amount of fraudulent transactions and their percentage, and the False Positive Rule (FPR) for transactions and also for the amount of transactions.

In report 1300a, a VIP risk score of 92 is seen in the fourth (4th) row, first (1st) column. For a VIP risk score of 92, it is predicted by the rules optimizer service for a optimized set of business rules that for 835,143 cumulative good transactions, there will be 162,548 cumulative fraudulent transactions, meaning that for $108,667,037 in a cumulative amount of transactions there will be $22,099,787 in a cumulative amount of fraud in the transactions, 2.5% cumulative fraudulent percentage of transactions, 2.9% cumulative fraudulent transaction amount, 5.1:1 False Positive Rule (FPR) transactions, and 4.9:1 False Positive Rule (FPR) amount of the transactions.

Report 1300b summarizes the aggregate authorization (AA) approval opportunity for Case Creations. The spreadsheet of report 1200b shows, for various risk scores, the cumulative number of non-fraudulent accounts, the cumulative number of fraudulent accounts, the cumulative amount of non-fraudulent (good) transactions, the cumulative percentage of fraudulent transactions, the cumulative percentage of fraudulent transaction amounts, and the False Positive Rule (FPR) for accounts.

In report 1300b, for a VIP risk score of 76 as seen in the fourth (4th) row, first (1st) column, it is predicted by the rules optimizer service for a optimized set of business rules that for 5,555,300 cumulative good accounts, there will be 363,628 fraudulent accounts, $9,220,712,294 cumulative amount in non-fraudulent (good) transactions, $201,860,074 in cumulative amount of fraudulent transactions, 10.9% cumulative fraudulent accounts, 18.5% cumulative fraudulent amount of transactions, and 15.3:1 False Positive Rule (FPR) of account.

FIG. 14 shows spreadsheets 1400a and 1400b which list business assumptions and constraints that can be used by a business rules optimizer service. Spreadsheet 1400a applies to real time declines and to account queuing. Spreadsheet 1400b applies to false decline reductions and model assumptions. The text in each cell in each spreadsheet is self-explanatory.

FIG. 15 shows a screen shot 1500 for a user interface that allows a user to input parameters for a full analysis. Screen shot 1500 allows the user to specify that there is to be a generation of a full analysis for each of three (3) different selected rule types, a targeted analysis on existing rules selected by the user from a pull down menu, and the selection of various versions of rule names and types. A "Generate Rules" icon on screen shot 1500 activates the business rules optimizer service to generate optimized rules using the user selected parameters and input.

Figure 16:
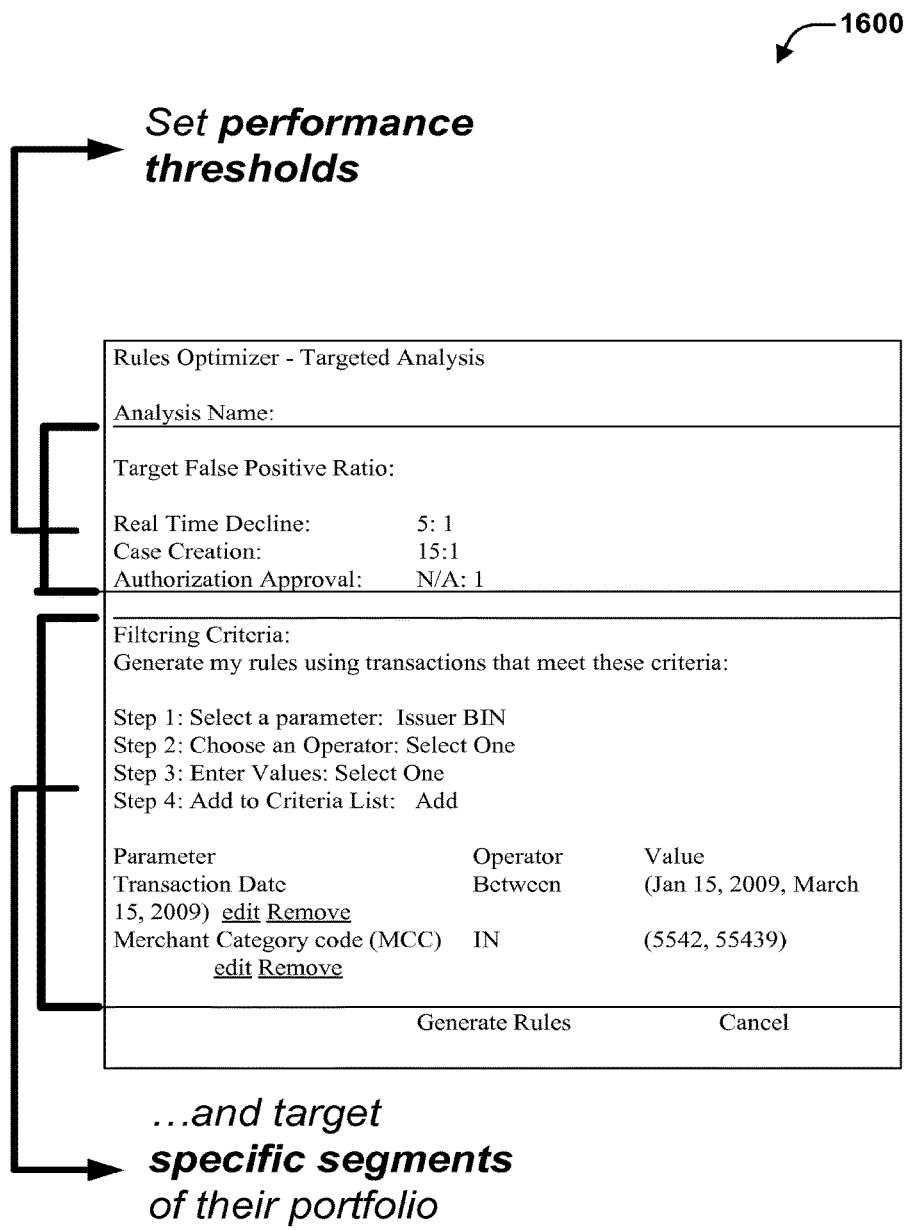

FIG. 16 shows a screen shot 1600 for the user interface that allows the user to specify an analysis name, input three (3) different target False Positive Rules, input filtering criteria from selected items on pull down menus, and edit or remove various parameters with respective operators and values to be used by the business rules optimizer service. For instance, screen shot 1500 allows the user to specify that the analysis is to be performed upon two (2) months of historical transactions (Jan. 15, 2009 through Mar. 15, 2000) for merchants having Merchant Commodity Codes (MCC) in a range from 5542 through 55439.

FIG. 17 shows other user selections and inputs in screen shot 1700a for specifying previous results for the issuer "Regional Bank ABC". A screen shot 1700b shows a performance summary for an optimized rule set. The user can select to (i) view the parameters used to produce the performance summary; (ii) view the rules; (iii) view the performance details; (iv) execute a test of the business rules; and (v) publish the optimized business rules to begin their implementation and use.

FIG. 18 shows other user selections and inputs in screen shot 1800 for displaying performance details by priority. The user can select to (i) execute a test of the business rules; and (ii) publish the optimized business rules to begin their implementation and use.

Turning to FIG. 19, the business rules optimizer service can be run automatically and without user intervention. In such implementations, historical transaction data is continually analyzed to create new sets of optimized business rules that are automatically implemented either by the issuer and/or by the payment processor, (transaction handler (th) 1902. The historical transaction data can be limited to one issuer or can include both this issuer and its peers, where 'peer' can be defined in a variety of ways to create a variety of analyzes and resultant optimized business rules that specify how to treat future transactions relative to authorization and fraud prevention. The historical transaction data can also include multiple transaction handlers 1902. As such, it would be advantageous for the transaction handler (th) 1902 who handles, and/or has access to, the past transaction data for other transaction handlers 1902. Such a transaction handler (th) 1902, through its access to a larger collection of historical transaction data, would able to 'data mine' the past transaction data for other transaction handlers 1902, and thereby have a better picture of fraud patterns and trends for its issuers.

By way of example of one implementation, an operations research analysis can be performed upon data of past transactions in a payment processing system such as is described below relative to FIG. 19. This analysis can determine, from data of past transactions, a low risk authorization score threshold for future transactions, and a high risk authorization score threshold for future transactions. A set of business rules can then be determined to maximize the number of future transactions to authorize which are equal to or less than the low risk authorization score threshold, and to minimize the number of high risk future transactions to authorize which are equal to or greater than the high risk authorization score threshold. These business rules, so optimized, are then implemented in a real time decisioning processor. Thereafter, for each of a plurality of future transactions, the implementation: (i) compares the transaction with the implemented set of business rules in the real time decisioning processor; (ii) determined from the comparison whether the transaction should be declined; and (iii) transmits a decline message when the transaction should be declined.

Exemplary Transaction Processing System

Referring to FIG. 19, the methods disclosed herein can be operated in the transaction processing system 1900. The general environment of FIG. 19 includes that of a merchant (m) 1910, such as the merchant, who can conduct a transaction for goods and/or services with an account user (au) (e.g., consumer) on an account issued to an account holder (a) 1908 by an issuer (i) 1904, where the processes of paying and being paid for the transaction are coordinated by at least one transaction handler (th) 1902 (e.g., the transaction handler) (collectively "users"). The transaction includes participation from different entities that are each a component of the transaction processing system 1900.

The transaction processing system 1900 may have at least one of a plurality of transaction handlers (th) 1902 that includes transaction handler (1) 1902 through transaction handler (TH) 1902, where TH can be up to and greater than an eight digit integer.

The transaction processing system 1900 has a plurality of merchants (m) 1910 that includes merchant (1) 1910 through merchant (M) 1910, where M can be up to and greater than an eight digit integer. Merchant (m) 1910 may be a person or entity that sells goods and/or services. Merchant (m) 1910 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 1908 may be a second merchant (m) 1910 making a purchase from another merchant (m) 1910.

Transaction processing system 1900 includes account user (1) 1908 through account user (AU) 1908, where AU can be as large as a ten digit integer or larger. Each account user (au) conducts a transaction with merchant (m) 1910 for goods and/or services using the account that has been issued by an issuer (i) 1904 to a corresponding account holder (a) 1908. Data from the transaction on the account is collected by the merchant (m) 1910 and forwarded to a corresponding acquirer (a) 1906. Acquirer (a) 1906 forwards the data to transaction handler (th) 1902 who facilitates payment for the transaction from the account issued by the issuer (i) 1904 to account holder (a) 1908.

Transaction processing system 1900 has a plurality of acquirers (q) 1906. Each acquirer (q) 1906 may be assisted in processing one or more transactions by a corresponding agent acquirer (aq) 1906, where 'q' can be an integer from 1 to Q, where aq can be an integer from 1 to AQ, and where Q and AQ can be as large as an eight digit integer or larger. Each acquirer (q) 1906 may be assisted in processing one or more transactions by a corresponding agent acquirer (aq) 1906, where 'q' can be an integer from 1 to Q, where aq can be an integer from 1 to AQ, and where Q and AQ can be as large as an eight digit integer or larger.

The transaction handler (th) 1902 may process a plurality of transactions within the transaction processing system 1900. The transaction handler (th) 1902 can include one or a plurality or networks and switches (ns) 1902. Each network/switch (ns) 1902 can be a mainframe computer in a geographic location different than each other network/switch (ns) 1902, where 'ns' is an integer from one to NS, and where NS can be as large as a four digit integer or larger.

Dedicated communication systems 1920, 1922 (e.g., private communication network(s)) facilitate communication between the transaction handler (th) 1902 and each issuer (i) 1904 and each acquirer (a) 1906. A Network 1912, via e-mail, the World Wide Web, cellular telephony, and/or other optionally public and private communications systems, can facilitate communications 1922a-1922e among and between each issuer (i) 1904, each acquirer (a) 1906, each merchant (m) 1910, each account holder (a) 1908, and the transaction handler (th) 1902. Alternatively and optionally, one or more dedicated communication systems 1924, 1926, and 1928 can facilitate respective communications between each acquirer (a) 1906 and each merchant (m) 1910, each merchant (m) and each account holder (a) 1908, and each account holder (a) 1908 and each issuer (i) 1904, respectively.

The Network 1912 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Network 1912 may contain either or both wired and wireless connections for the transmission of signals including electrical, magnetic, and a combination thereof. Examples of such connections are known in the art and include: radio frequency connections, optical connections, etc. To illustrate, the connection for the transmission of signals may be a telephone link, a Digital Subscriber Line, or cable link. Moreover, network 1912 may utilize any of a variety of communication protocols, such as Transmission Control Protocol/Internet Protocol (TCP /IP), for example. There may be multiple nodes within the network 1912, each of which may conduct some level of processing on the data transmitted within the transaction processing system 1900.

Users of the transaction processing system 1900 may interact with one another or receive data about one another within the transaction processing system 1900 using any of a variety of communication devices. The communication device may have a processing unit operatively connected to a display and memory such as Random Access Memory ("RAM") and/or Read-Only Memory ("ROM"). The communication device may be combination of hardware and software that enables an input device such as a keyboard, a mouse, a stylus and touch screen, or the like.

For example, use of the transaction processing system 1900 by the account holder (a) 1908 may include the use of a Portable Consumer payment Device (PCD). The PCD may be one of the communication devices, or may be used in conjunction with, or as part of, the communication device. The PCD may be in a form factor that can be: a card (e.g., bank card, payment card, financial card, credit card, charge card, debit card, gift card, transit pass, smart card, access card, a payroll card, security card, healthcare card, or telephone card), a tag, a wristwatch, wrist band, a key ring, a fob (e.g., SPEEDPASS® commercially available from ExxonMobil Corporation), a machine readable medium containing account information, a pager, a cellular telephone, a personal digital assistant, a digital audio player, a computer (e.g., laptop computer), a set-top box, a portable workstation, a minicomputer, or a combination thereof. The PCD may have near field or far field communication capabilities (e.g., satellite communication or communication to cell sites of a cellular network) for telephony or data transfer such as communication with a global positioning system (GPS). The PCD may support a number of services such as SMS for text messaging and Multimedia Messaging Service (MMS) for transfer of photographs and videos, electronic mail (email) access.

The PCD may include a computer readable medium. The computer readable medium, such as a magnetic stripe or a memory of a chip or a chipset, may include a volatile, a non-volatile, a read only, or a programmable memory that stores data, such as an account identifier, a consumer identifier, and/or an expiration date. The computer readable medium may including executable instructions that, when executed by a computer, the computer will perform a method. For example, the computer readable memory may include information such as the account number or an account holder (a) 1908's name.

Examples of the PCD with memory and executable instructions include: a smart card, a personal digital assistant, a digital audio player, a cellular telephone, a personal computer, or a combination thereof. To illustrate, the PCD may be a financial card that can be used by a consumer to conduct a contactless transaction with a merchant, where the financial card includes a microprocessor, a programmable memory, and a transponder (e.g., transmitter or receiver). The financial card can have near field communication capabilities, such as by one or more radio frequency communications such as are used in a "Blue Tooth" communication wireless protocol for exchanging data over short distances from fixed and mobile devices, thereby creating personal area networks.

Merchant (m) 1910 may utilize at least one POI terminal (e.g., Point of Service or browser enabled consumer cellular telephone); that can communicate with the account user (au) 1908, the acquirer (a) 1906, the transaction handler (th) 1902, or the issuer (i) 1904. A Point of Interaction (POI) can be a physical or virtual communication vehicle that provides the opportunity, through any channel to engage with the consumer for the purposes of providing content, messaging or other communication, related directly or indirectly to the facilitation or execution of a transaction between the merchant (m) 1910 and the consumer. Examples of the POI include: a physical or virtual Point of Service (POS) terminal, the PCD of the consumer, a portable digital assistant, a cellular telephone, paper mail, e-mail, an Internet website rendered via a browser executing on computing device, or a combination of the forgoing. Thus, the POI terminal is in operative communication with the transaction processing system 1900.

The PCD may interface with the POI using a mechanism including any suitable electrical, magnetic, or optical interfacing system such as a contactless system using radio frequency, a magnetic field recognition system, or a contact system such as a magnetic stripe reader. To illustrate, the POI may have a magnetic stripe reader that makes contact with the magnetic stripe of a healthcare card (e.g., Flexible Savings Account card) of the consumer. As such, data encoded in the magnetic stripe on the healthcare card of consumer read and passed to the POI at merchant (m) 1910. These data can include an account identifier of a healthcare account. In another example, the POI may be the PCD of the consumer, such as the cellular telephone of the consumer, where the merchant (m) 1910, or an agent thereof, receives the account identifier of the consumer via a webpage of an interactive website rendered by a browser executing on a World Wide Web (Web) enabled PCD.

Typically, a transaction begins with account user (au) 1908 presenting the portable consumer device to the merchant (m) 1910 to initiate an exchange for resources (e.g., a good or service). The portable consumer device may be associated with an account (e.g., a credit account) of account holder (a) 1908 that was issued to the account holder (a) 1908 by issuer (i) 1904.

Merchant (m) 1910 may use the POI terminal to obtain account information, such as a number of the account of the account holder (a) 1908, from the portable consumer device. The portable consumer device may interface with the POI terminal using a mechanism including any suitable electrical, magnetic, or optical interfacing system such as a contactless system using radio frequency or magnetic field recognition system or contact system such as a magnetic stripe reader. The POI terminal sends a transaction authorization request to the issuer (i) 1904 of the account associated with the PCD. Alternatively, or in combination, the PCD may communicate with issuer (i) 1904, transaction handler (th) 1902, or acquirer (a) 1906.

Issuer (i) 1904 may authorize the transaction and forward same to the transaction handler (th) 1902. Transaction handler (th) 1902 may also clear the transaction. Authorization includes issuer (i) 1904, or transaction handler (th) 1902 on behalf of issuer (i) 1904, authorizing the transaction in connection with issuer (i) 1904's instructions such as through the use of business rules. The business rules could include instructions or guidelines from the transaction handler (th) 1902, the account holder (a) 1908, the merchant (m) 1910, the acquirer (a) 1906, the issuer (i) 1904, a related financial institution, or combinations thereof. The transaction handler (th) 1902 may, but need not, maintain a log or history of authorized transactions. Once approved, the merchant (m) 1910 may record the authorization, allowing the account user (au) 1908 to receive the good or service from merchant (m) or an agent thereof.

The merchant (m) 1910 may, at discrete periods, such as the end of the day, submit a list of authorized transactions to the acquirer (a) 1906 or other transaction related data for processing through the transaction processing system 1900. The transaction handler (th) 1902 may optionally compare the submitted authorized transaction list with its own log of authorized transactions. The transaction handler (th) 1902 may route authorization transaction amount requests from the corresponding acquirer (a) 1906 to the corresponding issuer (i) 1904 involved in each transaction. Once the acquirer (a) 1906 receives the payment of the authorized transaction from the issuer (i) 1904, the acquirer (a) 1906 can forward the payment to the merchant (m) 1910 less any transaction costs, such as fees for the processing of the transaction. If the transaction involves a debit or pre-paid card, the acquirer (a) 1906 may choose not to wait for the issuer (i) 1904 to forward the payment prior to paying merchant (m) 1910.

There may be intermittent steps in the foregoing process, some of which may occur simultaneously. For example, the acquirer (a) 1906 can initiate the clearing and settling process, which can result in payment to the acquirer (a) 1906 for the amount of the transaction. The acquirer (a) 1906 may request from the transaction handler (th) 1902 that the transaction be cleared and settled. Clearing includes the exchange of financial information between the issuer (i) 1904 and the acquirer (a) 1906 and settlement includes the exchange of funds. The transaction handler (th) 1902 can provide services in connection with settlement of the transaction. The settlement of a transaction includes depositing an amount of the transaction settlement from a settlement house, such as a settlement bank, which transaction handler (th) 1902 typically chooses, into a clearinghouse bank, such as a clearing bank, that acquirer (a) 1906 typically chooses. The issuer (i) 1904 deposits the same from a clearinghouse bank, such as a clearing bank, which the issuer (i) 1904 typically chooses, into the settlement house. Thus, a typical transaction involves various entities to request, authorize, and fulfill processing the transaction.

The transaction processing system 1900 will preferably have network components suitable for scaling the number and data payload size of transactions that can be authorized, cleared and settled in both real time and batch processing. These include hardware, software, data elements, and storage network devices for the same. Examples of transaction processing system 1900 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 1902 can include one or more data centers for processing transactions, where each transaction can include up to 100 kilobytes of data or more. The data corresponding to the transaction can include information about the types and quantities of goods and services in the transaction, information about the account holder (a) 1908, the account user (au) 1908, the merchant (m) 1910, tax and incentive treatment(s) of the goods and services, coupons, rebates, rewards, loyalty, discounts, returns, exchanges, cash-back transactions, etc.

By way of example, network/switch (ns) 1902 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 1904 (or agent issuer (ai) 1904 thereof) and each acquirer (a) 1906 (or agent acquirer (aq) 1906 thereof) can use one or more router/switch (e.g., Cisco™ routers/switches) to communicate with each network/switch (ns) 1902 via dedicated communication systems.

Transaction handler (th) 1902 can store information about transactions processed through transaction processing system 1900 in data warehouses such as may be incorporated as part of the plurality of networks/switches 1902. This information can be data mined. The data mining transaction research and modeling can be used for advertising, account holder and merchant loyalty incentives and rewards, fraud detection and prediction, and to develop tools to demonstrate savings and efficiencies made possible by use of the transaction processing system 1900 over paying and being paid by cash, or other traditional payment mechanisms.

The VisaNet® system is an example component of the transaction handler (th) 1902 in the transaction processing system 1900. Presently, the VisaNet® system is operated in part by Visa Inc. As of 2006, the VisaNet® system was processing around 300 million transaction daily, on over 1 billion accounts used in over 170 countries. Financial instructions numbering over 16,000 connected through the VisaNet® system to around 30 million merchants (m) 1910. In 2007, around 71 billion transactions for about 4 trillion U.S. dollars were cleared and settled through the VisaNet® system, some of which involved a communication length of around 24,000 miles in around two (2) seconds.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions encoded in a computer readable medium that, when executed by a processor, create means for implementing the functional steps. In yet other implementations, instructions residing in any other computer program product, where those instructions are executed by a computer external to, or internal to, a computing system to perform one or more of the functional steps. In either case the instructions may be encoded in a computer readable medium comprising, for example, a magnetic information storage medium, an optical information storage medium, an electronic information storage medium, and the like. "Electronic storage media," may mean, for example and without limitation, one or more devices, such as and without limitation, a PROM, EPROM, EEPROM, Flash PROM, CompactFlash, SmartMedia, and the like It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A computer-implemented method for determining and for denying the authorization of fraudulent financial transactions, the computer-implemented method comprising:

receiving, via a communication network, by one or more processors, a request to authorize a transaction between a merchant and an account holder on an account issued by an issuer, wherein the transaction includes associated transaction data;

generating, via the one or more processors, a data structure defining a hyper-rectangle enclosing a multi-dimensional space defined by a plurality of edges, said data structure including data fields storing data for each of the plurality of edges of the hyper-rectangle, said plurality of edges representing a plurality of variable values;

retrieving, via the one or more processors, a target optimization variable associated with a data set;

in response to the determination that a number of points within the hyper-rectangle is greater than a minimum support parameter, removing, via the one or more processors, a first plurality of the points proximal to the plurality of edges;

in response to the determination that the mean value of the target optimization variable is maximized, adding, via the one or more processors, a second set of data fields representing a second plurality of points proximal to the plurality of edges until a threshold is reached;

bounding, via the one or more processors, the hyper-rectangle within a minimum bounding box, wherein the minimum bounding box defining a subspace confined by those dimensions involved in the first plurality of the points and the second plurality of the points;

identifying authorization business rules defining the minimum bounding box;

determining, via the one or more processors, points a plurality of fraud prevention boundary limits based on the determined minimum bounding box;

determining, via the one or more processors, whether the transaction is fraudulent based on the evaluating the authorization business rules on the received transaction data using the hyper-rectangle; and in response to the determination that the transaction is fraudulent, transmitting, via the one or more processors, via the communication network, a denial response to the request to authorize the transaction.

2. The method as defined in claim 1, further comprising in response to the determination that the transaction is fraudulent, notifying the issuer of the account.

3. The method as defined in claim 1, further comprising:
determining whether the transaction is eligible for backup processing; and
in response to the determination that the transaction is eligible for backup processing, applying a backup processing procedure to process the transaction.

4. The method as defined in claim 3, further comprising:
in response to the determination that the transaction is not eligible for backup processing, referring for processing the transaction to the issuer of the account upon which the transaction was being conducted.

5. The method as defined in claim 1, further comprising:
identifying, from the transaction data, at least one of i) an account number and ii) a Bank Identification Number (BIN);
determining whether the at least one of the account number and the BIN is a real-time decisioning participant; and
in response to the determination that the at least one of the account number and the BIN is a real-time descisioning participant, determining whether the transaction is fraudulent in real-time.

6. The computer implemented method of claim 1, wherein the plurality of input variable values respectively correspond to a plurality of transaction parameter input variables that are represented as points within the multi-dimensional space.

7. The computer implemented method of claim 6, wherein the hyper-rectangle includes a plurality of edges, each edge associated with one of the plurality of transaction parameter input variables.

8. The computer implemented method of claim 7, wherein the plurality of transaction parameter input variables is associated with a data set.

9. The computer implemented method of claim 8, wherein the data set corresponds to information from a plurality of historical transactions and each historical transaction was conducted between one of a plurality of merchants and one of a plurality of account holders on a corresponding account of the one of plurality of account holders issued by one of a plurality of issuers.

10. The method of claim 1, wherein maximizing a mean value of the target optimization variable for the hyper rectangle further comprises removing, via the one or more processors, a first plurality of points proximal to the plurality of edges, wherein said removing maximizes a mean value of the target optimization variable for the hyper-rectangle.

11. The method of claim 1, wherein bounding, via the one or more processors, the hyper-rectangle within a minimum bounding box further comprises defining dimensions for the minimum bounding box.

12. The method of claim 1, wherein defining dimensions for the minimum bounding box comprises at least the removal of the first plurality of points and the addition of the second plurality of points.

13. The method as defined in claim 1, further comprising obtaining the minimum support parameter.

14. The method as defined in claim 1, further comprising obtaining a maximum peeling parameter, wherein the maximum peeling parameter is the maximum count of the first plurality of points that is removable during said removing.

15. The method as defined in claim 1, further comprising obtaining a condition associated with at least one of the plurality of transaction parameter input variables, wherein the multi-dimensional space is defined by the plurality of input variable values that satisfy the condition.

16. The method as defined in claim 1, wherein the plurality of fraud prevention boundary limits correspond to the edges of the minimum bounding box.

17. The method as defined in claim 1, wherein the transaction parameter input variable to be optimized is one of: a mean sale amount for a merchant, a number of chargebacks; a transaction volume; and a number of fraudulent transactions.

18. A computer-readable medium having instructions stored thereon and executable by one or more processors to perform a method for determining and for denying the authorization of fraudulent financial transactions, the method comprising:

receiving, via a communication network, by one or more processors, a request to authorize a transaction between a merchant and an account holder on an account issued by an issuer, wherein the transaction includes associated transaction data;

generating, via the one or more processors, a data structure defining a hyper-rectangle enclosing a multi-dimensional space defined by a plurality of edges, said data structure including data fields storing data for each of the plurality of edges of the hyper-rectangle, said plurality of edges representing a plurality of variable values;

retrieving, via the one or more processors, a target optimization variable associated with a data set;

in response to the determination that a number of points within the hyper-rectangle is greater than a minimum support parameter, removing, via the one or more processors, a first plurality of the points proximal to the plurality of edges;

in response to the determination that the mean value of the target optimization variable is maximized, adding, via the one or more processors, a second set of data fields representing a second plurality of points proximal to the plurality of edges until a threshold is reached;

bounding, via the one or more processors, the hyper-rectangle within a minimum bounding box, wherein the minimum bounding box defining a subspace confined by those dimensions involved in the first plurality of the points and the second plurality of the points;

identifying authorization business rules defining the minimum bounding box;

determining, via the one or more processors, points a plurality of fraud prevention boundary limits based on the determined minimum bounding box;

determining, via the one or more processors, whether the transaction is fraudulent based on the evaluating the authorization business rules on the received transaction data using the hyper-rectangle; and in response to the determination that the transaction is fraudulent, transmitting, via the one or more processors, via the communication network, a denial response to the request to authorize the transaction.

19. A computer system for determining and for denying the authorization of fraudulent financial transactions, the computer system comprising:

a transaction handler that includes one or more processors, the transaction handler configured to:

receive, via a communication network, by the transaction handler, a request to authorize a transaction between a merchant and an account holder on an account issued by an issuer, wherein the transaction includes associated transaction data;

generate, via the transaction handler, a data structure defining a hyper-rectangle enclosing a multi-dimensional space defined by a plurality of edges, said data structure including data fields storing data for each of the plurality of edges of the hyper-rectangle, said plurality of edges representing a plurality of variable values;

retrieve, via the transaction handler, a target optimization variable associated with a data set;

in response to the determination that a number of points within the hyper-rectangle is greater than a minimum support parameter, remove, via the transaction handler, a first plurality of the points proximal to the plurality of edges;

in response to the determination that the mean value of the target optimization variable is maximized, add via the transaction handler, a second set of data fields representing a second plurality of points proximal to the plurality of edges until a threshold is reached;

bound, via the transaction handler, the hyper-rectangle within a minimum bounding box, wherein the minimum bounding box defining a subspace confined by those dimensions involved in the first plurality of the points and the second plurality of the points;

identify, via the transaction handler, authorization business rules defining the minimum bounding box;

determine, via the transaction handler, points a plurality of fraud prevention boundary limits based on the determined minimum bounding box;

determine, via the transaction handler, whether the transaction is fraudulent based on the evaluating the authorization business rules on the received transaction data using the hyper-rectangle; and in response to the determination that the transaction is fraudulent, transmit, via the transaction handler, via the communication network, a denial response to the request to authorize the transaction.

* * * * *